US006326704B1

(12) United States Patent
Breed et al.

(10) Patent No.: US 6,326,704 B1
(45) Date of Patent: Dec. 4, 2001

(54) VEHICLE ELECTRICAL SYSTEM

(75) Inventors: David S. Breed, Boonton Township, Morris County, NJ (US); Wilbur E. Duvall, Kimberling City, MO (US); Wendell C. Johnson, San Diego, CA (US)

(73) Assignee: Automotive Technologies International Inc., Denville, NJ (US)

(*) Notice: Subject to any disclaimer, the term of this patent is extended or adjusted under 35 U.S.C. 154(b) by 0 days.

(21) Appl. No.: 09/356,314

(22) Filed: Jul. 16, 1999

Related U.S. Application Data

(63) Continuation-in-part of application No. 09/137,918, filed on Aug. 20, 1998, now Pat. No. 6,175,787, and a continuation-in-part of application No. 08/947,661, filed on Oct. 9, 1997, now abandoned, which is a continuation-in-part of application No. 08/476,077, filed on Jun. 7, 1995, now Pat. No. 5,809,437.
(60) Provisional application No. 60/028,046, filed on Oct. 10, 1996.

(51) Int. Cl.[7] ........................................ G06F 1/26
(52) U.S. Cl. .................... 307/9.1; 307/10.1; 340/310.01; 701/49
(58) Field of Search ............................ 307/9.1, 10.1, 307/42, 155; 340/825.07, 825.06, 870.16, 310.01; 701/49

(56) References Cited

U.S. PATENT DOCUMENTS

| | | | |
|---|---|---|---|
| 1,837,140 | 12/1931 | Thew | 200/61.49 |
| 2,487,433 | 11/1949 | Gardenhour | 200/DIG. 29 X |
| 3,564,280 * | 2/1971 | Sognefest | 307/10.1 |
| 3,567,881 | 3/1971 | Duimstra | 200/61.53 |
| 3,673,362 | 6/1972 | Carlson et al. | 200/61.45 R |
| 3,674,950 | 7/1972 | Scoville | 200/61.48 |
| 3,715,535 | 2/1973 | Urenda | 200/61.53 |
| 3,891,965 * | 6/1975 | Schroeder | 340/870.16 |
| 3,911,666 | 10/1975 | Haber | 200/61.52 X |
| 4,013,526 | 3/1977 | Inoue | 204/129.46 |
| 4,016,752 | 4/1977 | Carey | 73/652 |
| 4,022,998 | 5/1977 | Fohl | 200/61.45 R |
| 4,128,005 | 12/1978 | Arnston et al. | 73/117.3 |
| 4,414,529 | 11/1983 | Yoshioka et al. | 337/365 |
| 4,418,388 | 11/1983 | Allgor et al. | 364/431.01 |
| 4,463,341 * | 7/1984 | Iwasaki | 340/310.01 |
| 4,528,541 | 7/1985 | Hollweck et al. | 337/354 |
| 4,804,132 | 2/1989 | DiFrancesco | 228/115 |
| 4,817,418 | 4/1989 | Asami et al. | 73/118.1 |
| 4,822,959 | 4/1989 | Schwab | 200/5 A |

(List continued on next page.)

OTHER PUBLICATIONS

Liubakka et al., "Failure Detection Algorithms Applied to Control System Design for Improved Diagnostics and Reliability", SAE Technical Paper Series, 02–29 to 04–04, 1988, pp. 1–7.

James et al., "Microprocessor Based Data Acquisition for Analysis of Engine Performance", SAE Technical Paper Series, Feb. 23–27, 1987, pp. 1–9.

Making New Connections, Andrew J. Markel, IAI, pp. 39–40, Apr., 1999.

Siemens Jumps on the IDB Bus, News Release from Siemens Automotive Corporation, Feb. 28, 1999.

*Primary Examiner*—Albert W. Paladini
(74) *Attorney, Agent, or Firm*—Brian Roffe

(57) ABSTRACT

Electrical system in a vehicle including a plurality of devices used in the operation of the vehicle, a single communication bus to which the devices are connected and a single power bus to which the devices are connected. The devices include at least one accelerometer and/or at least one airbag initiator. The power bus provides power to the devices while the communication bus provides communications to and from the devices to, e.g., a control module. The devices are preferably provided with individual device addresses such that each device will respond only to its device address. Each bus may include a pair of wires and a single pair of wires may constitute both buses.

31 Claims, 31 Drawing Sheets

U.S. PATENT DOCUMENTS

| | | | |
|---|---|---|---|
| 4,948,927 | 8/1990 | Pajak | 200/33 R |
| 5,041,976 | 8/1991 | Marko et al. | 364/424.03 |
| 5,043,690 | 8/1991 | Wahls | 337/370 |
| 5,081,586 * | 1/1992 | Barthel et al. | 307/10.1 |
| 5,083,697 | 1/1992 | DiFrancesco | 228/116 |
| 5,155,308 | 10/1992 | Blair | 200/61.52 |
| 5,181,005 | 1/1993 | Bayer | 337/354 |
| 5,204,647 | 4/1993 | Nagamoto et al. | 335/80 |
| 5,216,396 | 6/1993 | Stahly | 335/80 |
| 5,313,407 | 5/1994 | Tiernan et al. | 364/508 |
| 5,325,082 | 6/1994 | Rodriguez | 340/438 |
| 5,333,240 | 7/1994 | Matsumoto et al. | 395/23 |
| 5,334,809 | 8/1994 | DiFrancesco | 200/262 |
| 5,400,018 | 3/1995 | Scholl et al. | 340/825.54 |
| 5,406,502 | 4/1995 | Haramaty et al. | 364/551.01 |
| 5,430,614 | 7/1995 | DeFrancesco | 361/785 |
| 5,442,553 | 8/1995 | Parrillo | 364/424.04 |
| 5,451,352 | 9/1995 | Cook | 264/102 |
| 5,456,404 | 10/1995 | Robinette, Jr. et al. | 228/104 |
| 5,457,293 | 10/1995 | Breed | 200/61.52 |
| 5,469,150 * | 11/1995 | Sitte | 340/825.07 |
| 5,471,151 | 11/1995 | DiFrancesco | 324/757 |
| 5,481,906 | 1/1996 | Nagayoshi et al. | 73/116 |
| 5,506,514 | 4/1996 | DiFrancesco | 324/757 |
| 5,527,591 | 6/1996 | Crotzer et al. | 428/209 |
| 5,559,311 | 9/1996 | Gorbatoff | 200/513 |
| 5,744,765 | 4/1998 | Yamamoto | 200/6 A |
| 5,745,027 * | 4/1998 | Malville | 340/310.01 |
| 5,796,057 | 8/1998 | Nakajima et al. | 200/6 B |
| 5,809,437 | 9/1998 | Breed | 701/29 |
| 5,834,716 | 11/1998 | Lee | 200/5 R |
| 5,859,584 * | 1/1999 | Counsell et al. | 340/310.01 |

* cited by examiner

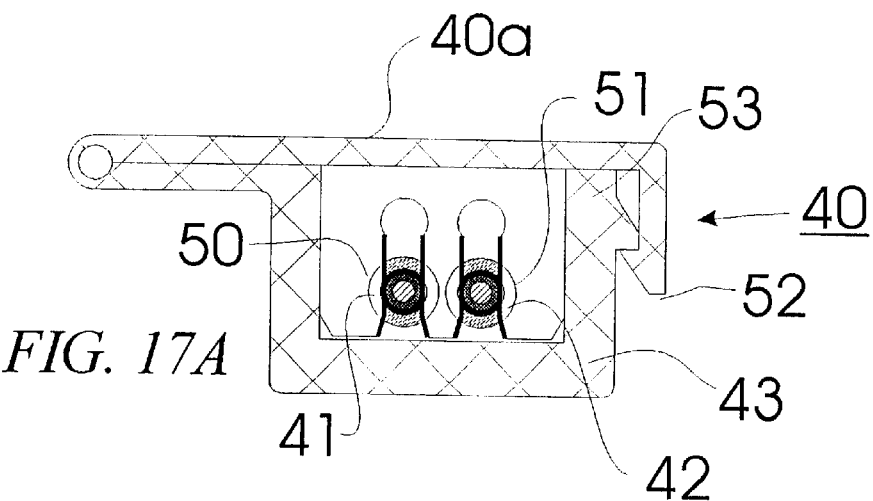
FIG. 17A
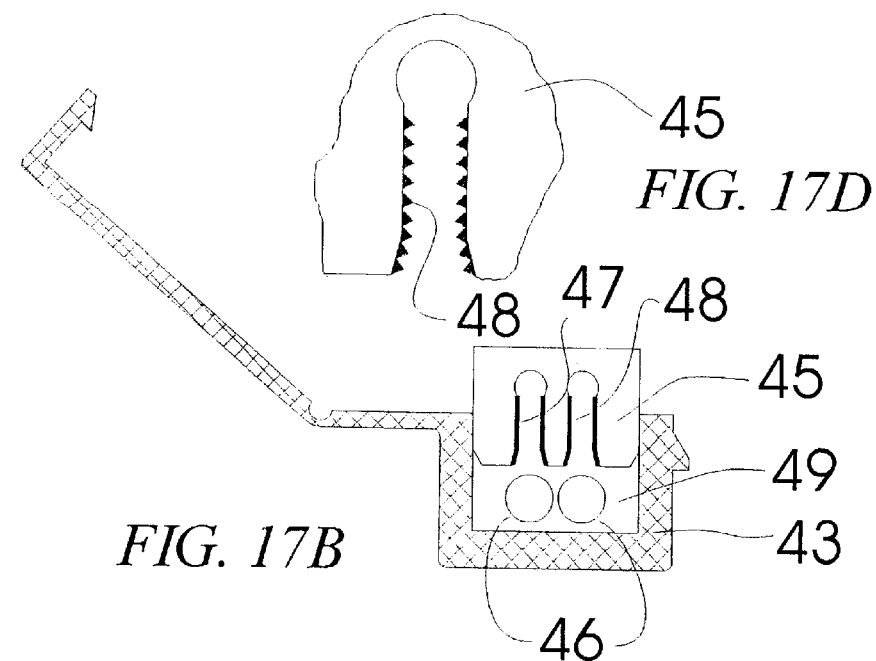
FIG. 17D
FIG. 17B
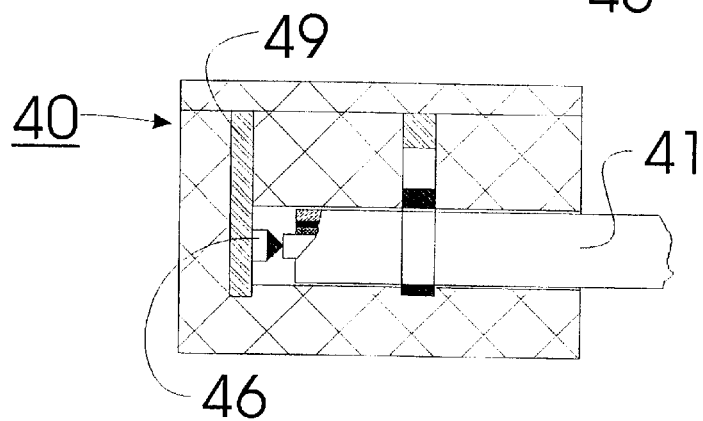
FIG. 17C

VEHICLE ELECTRICAL SYSTEM

CROSS-REFERENCE TO RELATED APPLICATIONS

This application is a continuation-in-part of U.S. patent application Ser. No. 08/947,661 filed Oct. 9, 1997 now abandoned and a continuation-in-part of U.S. patent application Ser. No. 09/137,918 filed Aug. 20, 1998 now U.S. Pat. No. 6,175,787, which in turn is a continuation-in-part of U.S. patent application Ser. No. 08/476,077 filed Jun. 7, 1995, now U.S. Pat. No. 5,809,437, which is incorporated herein by reference in its entirety.

This invention also claims domestic priority of U.S. provisional patent application Serial No. 60/028,046 filed Oct. 10, 1996 through U.S. patent application Ser. No. 08/947,661 filed Oct. 9, 1997.

This invention is related to U.S. Pat. No. 5,457,293 by the same inventor entitled "Inertia or Gravity Responsive Tilt Switch", the disclosure of which is hereby incorporated by reference herein.

FIELD OF THE INVENTION

This invention is in the general field of wiring systems applied to vehicles and particularly to motor vehicles such as automobiles. It specifically addresses the use of a common wire bus or data bus for a plurality of sensors and actuators in a motor vehicle.

BACKGROUND OF THE INVENTION

It is not uncommon for an automotive vehicle today to have many motors, other actuators, lights etc., controlled by one hundred or more switches and fifty or more relays and connected together by almost five hundred meters of wire, and close to one thousand pin connections grouped in various numbers into connectors. It is not surprising therefore that the electrical system in a vehicle is by far the most unreliable system of the vehicle and the probable cause of most warranty repairs.

Unfortunately, the automobile industry is taking a piecemeal approach to solving this problem when a revolutionary approach is called for. Indeed, the current trend in the automotive industry is to group several devices of the vehicle's electrical system together which are located geometrically or physically in the same area of the vehicle and connect them to a zone module which is then connected by communication and power buses to the remainder of the vehicle's electrical system. The resulting hybrid systems still contain substantially the same number and assortment of connectors with only about a 20% reduction in the amount of wire in the vehicle.

OBJECTS OF THE INVENTION

Accordingly, it is an object of the present invention to provide a new and improved electrical wiring system for coupling sensors and actuators in a motor vehicle in order to reduce the amount of wire in the motor vehicle.

Another object of the present invention is to provide an improvement over the zone module system used in prior art applications and render the zone module system obsolete.

Additional objects of this invention include to provide a vehicle wiring system including:

one or more switches having contact surfaces which are not eroded over the life of the contact after many makes and breaks, i.e., closing of the switch and opening of the switch, respectively;

one or more relays having contact surfaces which are not eroded over the life of the contact after many makes and breaks;

a network comprising various safety devices such as crash sensors and airbag inflator igniters one or more connectors which maintain good contact quality over the life of the connector even after being disassembled numerous times and soaked with water and other fluids;

a coating for contact surfaces of the vehicle wiring system which contains abrasive particles and which results in a reduction in the contact resistance; and one or more switches, relays or connectors with lower contact resistance for use in the automotive environment.

SUMMARY OF THE INVENTION

In order to achieve the objects set forth above and others, in one embodiment of a vehicle electrical wiring system in accordance with the invention, most if not all of the devices are connected together with a single communication bus and a single power bus. In the preferred case, a single wire pair will serve as both the power and communication buses. When completely implemented, each device on the vehicle will be coupled to the power and communication buses so that they will now have an intelligent connection and respond only to data that is intended for that device, that is, only that data with the proper device address. Although initially a network coding and decoding chip will be expensive, when there are one hundred or more per vehicle, for example, the cost can be expected to drop to where it is more than covered by the cost savings in vehicle wiring assembly. Similar chips are in fact now in production for use in wiring buildings as part of the LonWorks network by Echelon Corporation of Palo Alto, Calif. In particularly advantageous embodiments, the devices include at least one accelerometer and/or at least one airbag initiator.

In one preferred implementation, the 12-volt, or other voltage, power distribution network also serves as the information network. It can be a time multiplex network, meaning that data sent from one node to another is multiplexed in the time domain rather than the frequency domain. In the extreme case of this network, only a single wire is required with the return, or ground, taking place through the vehicle sheet metal and chassis. All sensors, switches and actuators become active devices on the network. Either special chips or low cost microprocessors are used for the coding and decoding on the data at each device.

Particle Interconnect (PI) may be used to increase the reliability of all connections, switches and relays. PI may also be used to make the connections to the chassis reliable.

Under one preferred design, the network protocol permits critical devices to grab the network when needed. Either coaxial cable or twisted wires, or a combination thereof, are used typically with non-wicking sealant, and if compressed together, provides good inter-strand contact even with sealant. In some cases, particles are added to the sealant to enhance the inter-strand connections when the connectors make connection only to the outermost wires in the bundle. Wicking is when a cut or abrasion occurs in the wire and water wicks through the wire and into various devices. In prior art ball-in-tube sensors used for sensing automobile crashes to deploy airbags, for example, in the early days a significant percentage of the sensors eventually filled with water since there was an air volume trapped in the sensor which acted like a pump as the sensor was heated and cooled by the weather etc. Non-wicking wire, which is wire that contains a sealant, would have prevented this problem. For example, telephone wires that come in from the street to houses are usually coated with a black sealant that prevents water from traveling through the wire bundle.

The benefits to be derived from the vehicle electrical system described herein include at least at 50% cost saving when fully implemented compared with current wire harnesses. A weight savings of at least 50% is also expected. Most importantly, a multi-fold improvement in reliability will result. The assembly into the vehicle is greatly simplified as is the repair in the event that there is a failure in the wiring harness. Most of the connectors are eliminated and the remaining ones are considerably more reliable. Diagnostics on all devices on key-on can now be accomplished over the network with a single connection from the diagnostic circuit. For example, it will now be easy to detect burnt out lights, loose devices, shorts, disconnects, blown fuses, etc. The fusing can be part of each device that makes it easy to identify where the problem is. Therefore, fuses aren't replaced, instead the device or circuit is replaced after the problem is located. In contrast to other multiplexing systems based on zone modules, the communication from and to each device in the instant invention is bi-directional.

It is now believed that for side impacts, the airbag crash sensor should be placed in the door. There is reluctance to do so by the automobile manufacturers since in a crash into the A-pillar of the vehicle, for example, the wires leading to and form the door may be severed before the crash sensor activates. By using the two wire network as described herein, only two, or possibly four if a separate pair is used for power, of wires will pass from the door into the A-pillar instead of the typically fifty or more wires. In this case, the wires can be protected so that they are stronger than the vehicle metal and therefore will not sever during the early stages of the accident and thus the door mounted sensor can now communicate with the airbag in the seat, for example.

In the preferred system then, the power line or distribution network in the vehicle is used to simultaneously carry both power and data to all switches, sensors, lights, motors, actuators and all other electrical and electronic devices (hereinafter called devices) within the vehicle. Naturally, the same system will also work for vehicles having different voltages such as 48 volts. Also a subset of all vehicle devices can be on a net. Initially, for example, an automotive manufacturer may elect to use the system of this invention for the automobile safety system and later expand it to include other devices. The data, in digital form, is carried on a carrier frequency, or as pulse data as in the ethernet protocol, and is separated at each device using either a microprocessor, "high-side driver" or other similar electronic circuit. Each device will have a unique, individualized address and be capable of responding to a message sent with its address. A standard protocol will be implemented such as SAE J1850 where applicable. The return can be through vehicle ground comprising the vehicle sheet metal and chassis or through a wire.

The advantages of such a system are numerous, among which the following should be mentioned:

1. The amount of wire in the vehicle will be substantially reduced. There is currently about 500 or more meters of wire in a vehicle;
2. The number and complexity of connectors will be substantially reduced. There are currently typically about 1000 pin connections in a vehicle. When disconnection is not required, a sealed permanent connector will be used to join wires in, for example, a T connection. On the other hand, when disconnection is required, a single or dual conductor connector is all that is required and the same connector can be used throughout the vehicle. Thus, there will be only one or two universal connector designs on the vehicle.
3. The number of electronic modules will be substantially reduced and maybe even be completely eliminated. Since each device will have its own microprocessor, zone modules, for example, will be unnecessary.
4. Installation in the vehicle will be substantially easier since a single conductor, with branches where required, will replace the multi-conductor wire harnesses currently used. Wire "choke points" will be eliminated.
5. Reliability will be increased based on system simplicity.
6. Two way or bi-directional communication is enabled between all devices. This simplifies OBD2 (On Board Diagnostic Level 2 now required by the U.S. Government for pollution control) installation, for example.
7. All devices on the vehicle are diagnosed on key-on. The driver is made aware of all burned out lamps, for example before he or she starts the vehicle.
8. Devices can be located at optimum places. A side impact sensor can be placed within the vehicle door and still communicate with an airbag module located in the seat, for example, with high reliability and without installation of separate wiring. In fact, only a single or dual wire is required to connect all of the switches, sensors, actuators and other devices in the vehicle door with the remainder of the vehicle electrical system.
9. Electro-magnet interference (EMI) Problems are eliminated. The driver airbag system, for example would have the final circuit that deploys the airbag located inside the airbag module and activated when the proper addressed signal is received. Such a circuit would have an address recognition as well as diagnostic capabilities and might be known as a "smart inflator". EMI, which can now cause an inadvertent airbag deployment, ceases to be a problem.
10. Vehicle repair is simplified and made more reliable.

It is important that the wire be designed so that it won't break even in an accident since if the single bus breaks the results can be catastrophic. Additionally, the main bus wire or pair of wires can be in the form of a loop around the vehicle with each device receiving its messages from either direction such that a single major break can be tolerated. Alternately, a tree or other convenient structure can be used and configured so that at most, a single branch of the network is disabled.

It should be understood that with all devices having access to the network, there is an issue of what happens if many devices are attempting to transmit data and a critical event occurs, such as a crash of the vehicle, where time is critical, i.e., will the deployment of an airbag be delayed by this process. However, it is emphasized that although the precise protocol has not yet been determined pending consultation with a customer, protocols do exist which solve this problem. For example, a token ring or token slot network where certain critical functions are given the token more frequently than non-critical functions and where the critical device can retain the token when a critical event is in progress is one solution. A crash sensor, for example, knows that a crash is in progress before it determines that the crash severity requires airbag deployment. That information can then be used to allocate the token to the crash sensor. An alternate approach is to use a spread spectrum system whereby each device sends and is responsive to a pattern of data that is sorted out using correlation techniques permitting any device to send and receive at anytime regardless of the activity of any other device on the network.

Another issue of concerns is the impact of vehicle noise on the network. In this regard, since every device will be capable of bi-directional communication, standard error checking and correction algorithms are employed. Each device is designed to acknowledge receipt of a communication or the communication will be sent again until such time as receipt thereof by the device is acknowledged. Calculations show that the bandwidth available on a single or dual conductor is orders of magnitude greater than required to carry all of the foreseeable communication required within an automobile. Thus, many communication failures can be tolerated.

Still another issue relates to the effect of moisture in view of the single or dual wire system, since moisture can travel from a breach of the installation to everywhere within the vehicle. To control the moisture, the wire can be surrounded by a sealant that is flexible but does not permit the wicking of moisture. This sealant, which has been especially developed for automotive applications, is similar to the sealant used to coat underground telephone cables.

It is also important that the T connectors achieve sufficient electrical connection to the wire strands for good high current connection. In this context, although the sealant by itself is an insulator, it can be filled with conductive particles that assure good interconnection between the strands. Thus, although the T connectors may only make good connection to the outside strands of the wire, good electrical connection also occurs to the inner strands.

Thus, one embodiment of the vehicle electrical system in accordance with the invention includes a plurality of electrical devices used in the operation of the vehicle, a single communication bus, all of the devices being connected to the communication bus and a single power bus, all of the devices being connected to the power bus (which may be one and the same as the communication bus). The devices are preferably provided with individual device addresses such that each device will respond only to its device address. Each bus may comprise a pair of wires connected to all of the devices. The devices being e.g., actuators, sensors, lights and switches. If each device is assigned a unique address, the communication bus may be arranged to transfer data in the form of messages each having an address of a respective device such that only the respective device assigned to that address is responsive to the message having the address. Each device thus includes means for determining whether the messages of the communication bus include the address assigned to the device, e.g., a microprocessor. The communication bus may also includes a token ring network to provide a protocol for the transfer of messages through the communication bus. Each device may be arranged to acknowledge receipt of a communication via the communication bus and indicate operability of the device upon ignition of the vehicle.

Another electrical system in a vehicle in accordance with the invention comprises a plurality of devices used in the operation of the vehicle, and a single network constitution both a power distribution and a communication/information bus. The network may be a time multiplex network and consists of a single wire, or a pair of wires, connecting all of the devices. For the single wire case, each device is grounded to an adjacent part of the vehicle.

Still another electrical system in a vehicle in accordance with the invention comprises a plurality of sensors, each detecting a physical characteristic of the vehicle, and a data bus, all of the sensors being connected to the data bus. A module is also preferably connected to the data bus and arranged to receive signals from the sensors and process the signals to provide information derived from the physical characteristics detected by the sensors. The module may be arranged to process the physical characteristics detected by the sensors to determine whether a component in the vehicle is operating normally or abnormally. A display, e.g., a light on the vehicle dashboard, may be coupled to the module for displaying the information derived from the physical characteristics detected by the sensors. A telecommunications device may also be coupled to the module for communicating with a remote station to provide the remote station with the information derived from the physical characteristics detected by the sensors, e.g., impending failure of a specific vehicle component or a vehicle crash. More specifically, the sensors may generate signals containing information as to whether the component is operating normally or abnormally whereby the module comprises pattern recognition means for receiving the signals and ascertaining whether the signals contain patterns representative of normal or abnormal operation of the component.

Another issue of concern is that the electrical connection to the vehicle metal is historically poor and thus good electrical connection from each of the devices to the vehicle metal, for the case where the vehicle metal is used for the ground return circuit or for the case where connection to the vehicle is to be monitored, and from one part of the vehicle to another must be made. To this end, a relatively new technology, called Particle Interconnect (PI), is employed which provides low resistance interconnection between two metal parts even if one is coated with paint, for example. Some common implementations of this technology use a diamond particle coating and are employed at the interface between each device and vehicle metal as well as between various metal parts on the vehicle where good electrical connection is required.

With a single pair of wires in a twisted pair or coaxial configuration for the communication bus, and perhaps another for the power bus, the connector problem can now be addressed as a single design can be used for all connections on the bus and each connector will only be connecting at most two wires. A great deal of effort can thus be applied to substantially improve the reliability of such a connector.

Similar improvements are also required in mechanical switches and relays before the process is complete and the reliability of the vehicle system is again acceptable. In this regard, this invention is concerned in part with such improvements in connectors, switches and relays and uses the teachings of U.S. Pat. No. 5,457,293 to Breed, "Inertia or Gravity Responsive Tilt Switch" and those of U.S. Pat. Nos. 5,083,697 and 5,334,809 to DiFrancesco, the disclosures of which are incorporated herein by reference.

The tilt switch described in U.S. Pat. No. 5,457,293 was primarily invented to replace mercury tilt switches. To understand the application of particle interconnect to automotive switches, relays and connectors, the teachings of that patent will be repeated here. Most tilt switches in use today use mercury. Mercury even in small amounts is toxic to the environment and particularly to human beings. It has been estimated that tens of millions of mercury switches are manufactured every year and thus, even though each switch contains only a small quantity of mercury, the total quantity is significant. As a result, several states have considered banning the use of mercury switches.

In mercury tilt switches, the mercury is both the seismic mass and the electrical conductor that closes the electrical circuit. Impurities in the mercury tend to remain on the surface, thus clean liquid metal interacts with the solid metal electrical conductors to form a low-resistant conductive path from one conductor to the other.

To achieve a comparable low resistance using conventional switches, a substantial force is required between the switch contacts. This force is typically around 5 grams in order to produce contact resistances significantly below 0.1 ohms. Since tilt switches commonly operate when the tilt angle is less than 10 degrees, the mass of the seismic mass using a pivoting technology, for example, can become excessive. For example, in order to achieve a 5 gram contact force in such a system, the mass at an angle of 10 degrees would have to be approximately 30 grams. Such a switch would obviously be considerably larger than current mercury switches wherein the mass of the mercury is usually less than about 3 grams. Such switches, for example, could not be used interchangeably with current mercury switches. The substitution of mechanical switches in many cases would require significant design changes in devices which now use mercury tilt switches, such as emergency shutoff switches for irons, wall mounted silent switches and thermostats.

Mechanical tilt switches can also be sensitive to vibration that is less of a problem with mercury tilt switches. The presence of vibration can cause intermittent switch closures especially when the tilt switches are nearly at the marginal tilt angle.

These and other problems associated with prior art tilt switches are solved by the inventions disclosed herein as well as by the inventions disclosed in the '293 patent.

Preferred embodiments of the switches, relays and connectors of this invention utilize a novel contact surface containing abrasive particles to substantially reduce the contact force required to achieve a low contact resistance and substantially increase the reliability and life of the device. This also permits a substantial reduction in the size of the device. The key achievement is the reliability improvements in connectors, switches and relays over the life of the vehicle and in the severe automotive environments.

BRIEF DESCRIPTION OF THE DRAWINGS

The following drawings are illustrative of embodiments of the invention and are not meant to limit the scope of the invention as encompassed by the claims.

FIGS. 17a, 17b, 17c and 17d are different views of an automotive connector for use with a coaxial electrical bus for a motor vehicle illustrating the teachings of this invention.

DESCRIPTION OF THE PREFERRED EMBODIMENTS

The operation of a tilt switch as described in the above referenced U.S. Pat. No. 5,457,293 illustrates many of the features which are employed in this invention for use in automotive switches, relays and connectors and the disclosure from that patent is therefore repeated herein.

Figure 1:
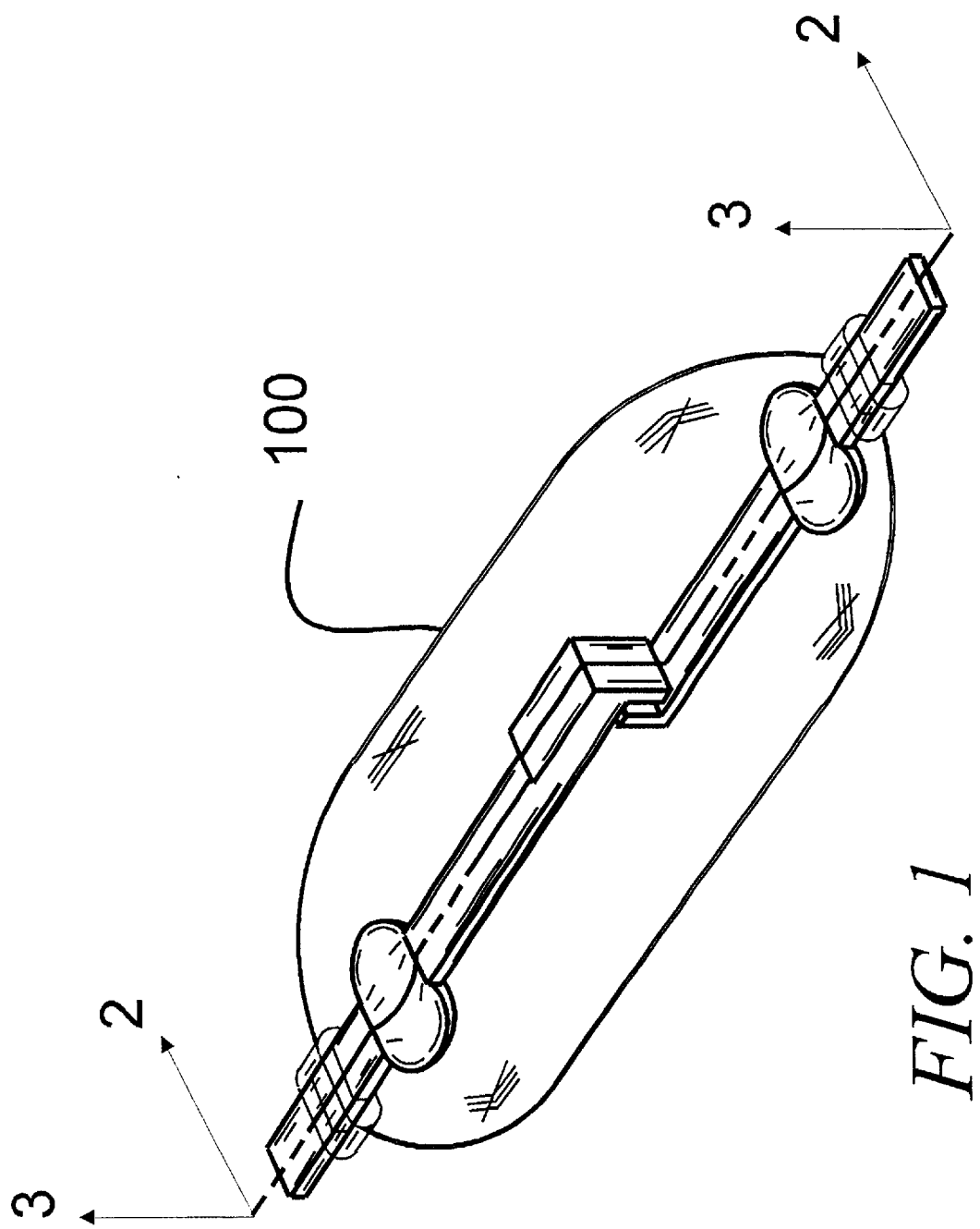
FIG. 1 is a perspective view of a preferred embodiment of the mechanical tilt switch of the present invention.

Referring to the accompanying drawings wherein like reference numerals refer to the same or similar elements, the prospective view with certain parts removed of a preferred embodiment of a mechanical tilt switch of the present invention is shown at 100 in FIG. 1.

Figure 3A:
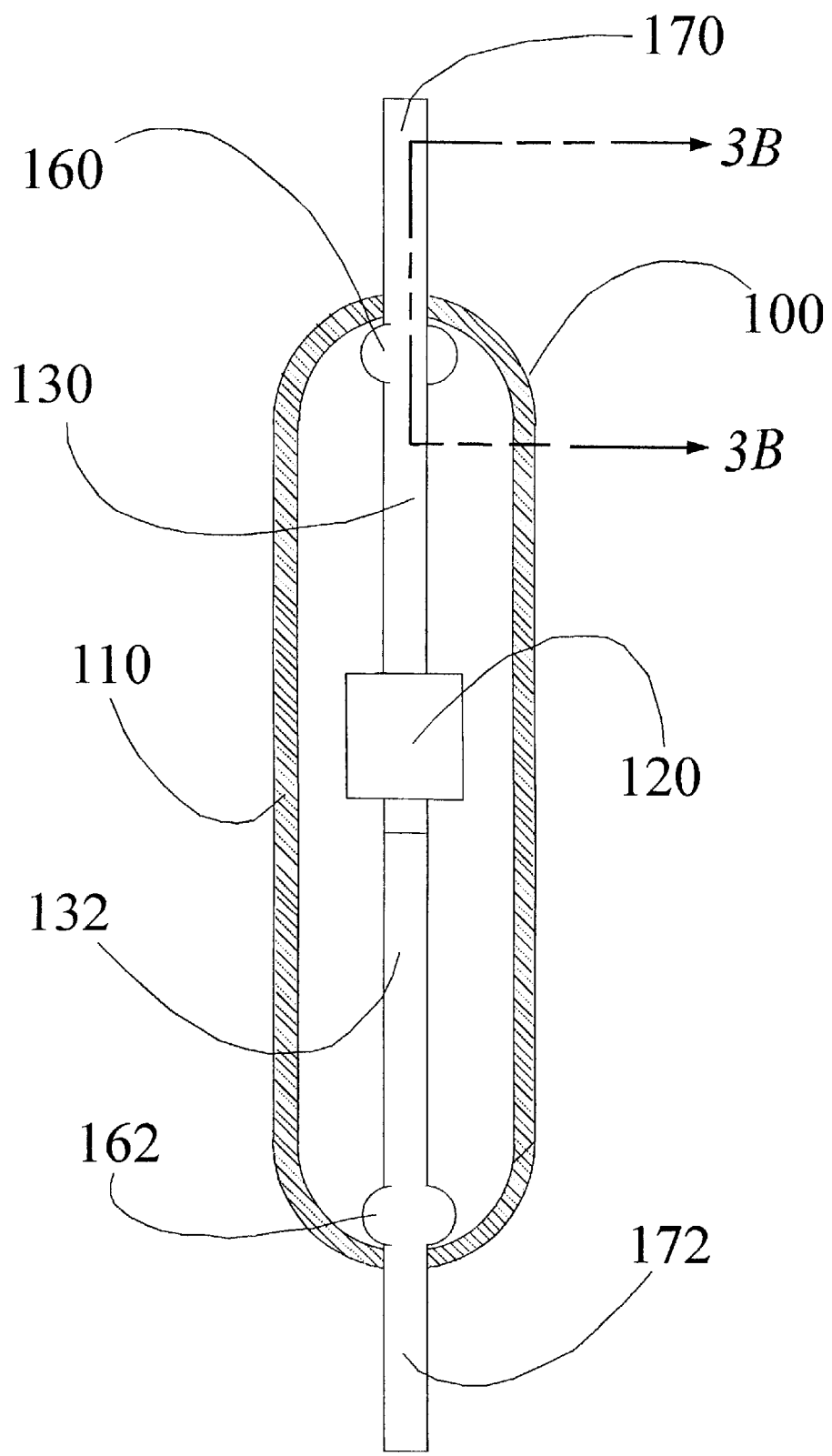
FIG. 3A is a cross sectional view of the apparatus of FIG. 1 taken along lines 3—3.

The switch 100 includes a substantially cylindrical housing 110 made of a material such as glass and contains in an interior thereof, an elongate beam 130 having a seismic mass 120 coupled thereto at a location within the housing 100 and a contact 152 oriented at the end of the beam 130 and at an angle with respect to the beam 130. A second elongate beam 132 having a contact 150 oriented at the end of the beam 132 and at an angle with respect to the beam 132 is also enclosed in the interior of the glass housing 110. Both beams 130 and 132 contain hinges or hinged portions 160 and 162, respectively, formed within the beam by a reduction in the arm thickness as described below (FIG. 3A). Beams 130 and 132 also contain lead sections 170 and 172, respectively, which are attached to the glass housing 110 and project through the housing for attachment to other apparatus not shown. In general, the contacts 152 and 150 may be attached to or a part of their respective beams 130 and 132. In both cases, they will be considered as "integral with" their respective beams.

In a non-actuated position, the contacts 150,152 are separated from one another so that they, e.g., prevent the completion of an electrical circuit.

Figure 2A:
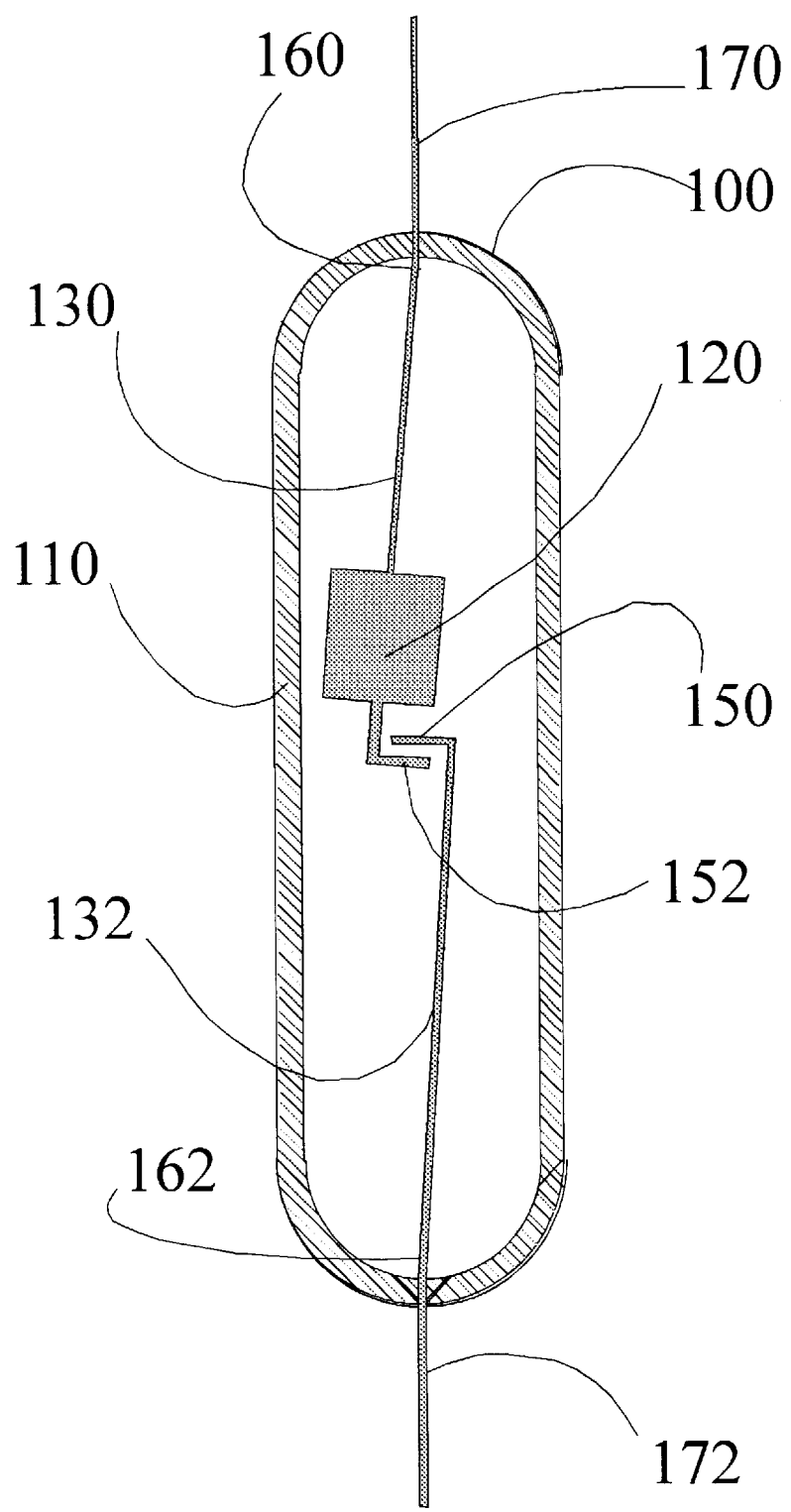
FIG. 2A is a cross sectional view of the apparatus of FIG. 1 taken along lines 2—2 shown in the non-actuation position.
Figure 2B:
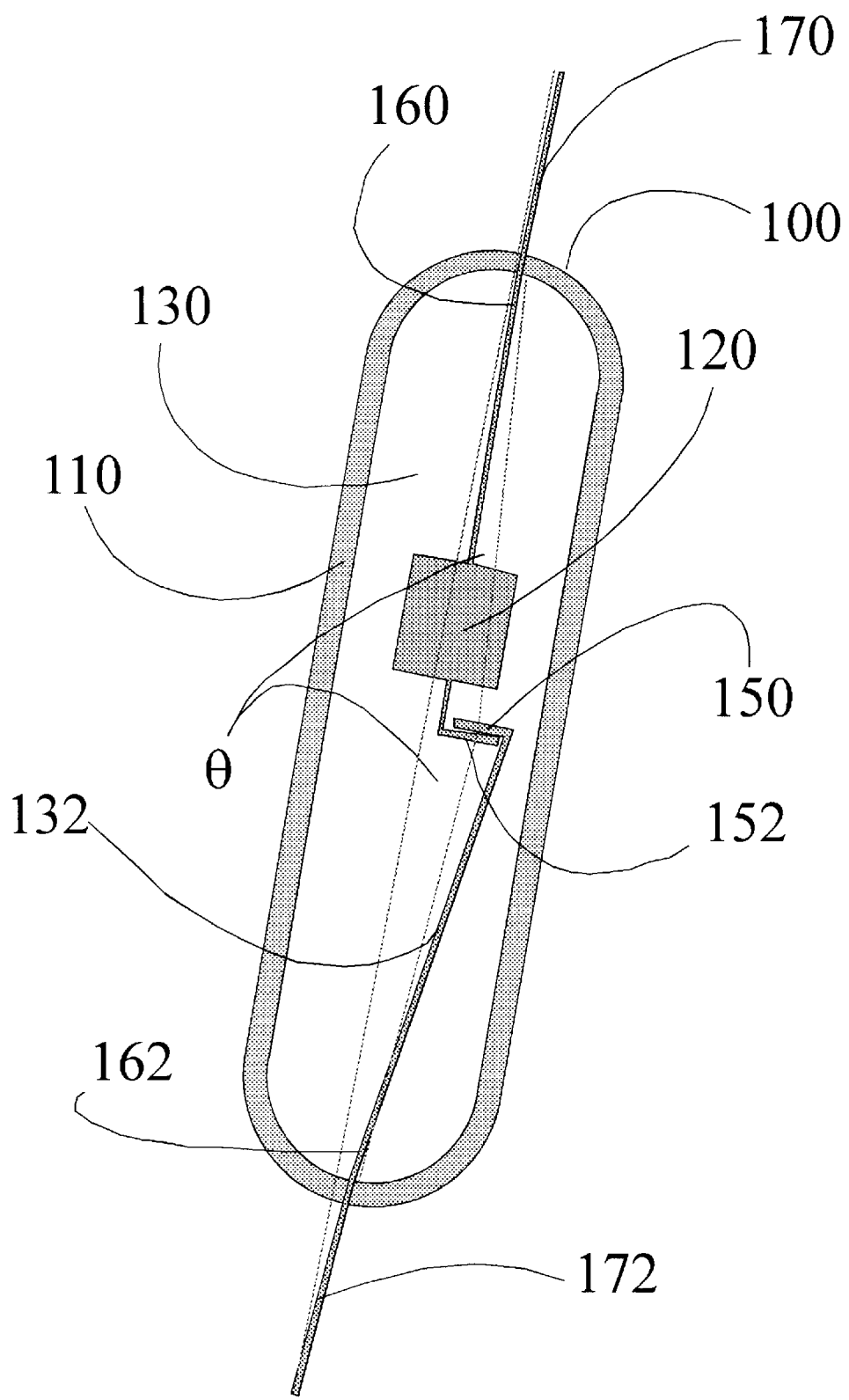
FIG. 2B is a cross sectional view of the apparatus of FIG. 1 taken along lines 2—2 shown in the actuation position.

If the tilt switch is tilted by an angle such as 10 degrees as shown in FIG. 2B, the seismic mass 120 causes beam 130 to rotate about hinge 160. After a small motion such as 5 degrees, denoted by □ in FIG. 2B, contact 150 engages contact 152 and further motion of the seismic mass 120 is impeded. This creates a tension in beams 130 and 132 and a corresponding force between contacts 150 and 152 of the same magnitude. It was shown in the '293 patent that through this geometry, the force for the contacts created by the tilting of the tilt switch can be more than 10 times the force between the case of two parallel contacts.

If the contacts 150,152 are arranged to be parallel to one another, as shown in FIG. 4 for example, the force between the contacts would be approximately the same as the force on seismic mass 120 in the direction of its motion caused by the tilt of the switch. Thus, through the geometry shown in FIGS. 2A and 2B, an amplification of the tilt force of a factor exceeding 10 is achieved. Alternately, to achieve the same contact force, the seismic mass 120 need be only one-tenth as great if the geometry of FIGS. 2A and 2B was used then if the geometry of FIG. 4 is used.

Figure 2C:
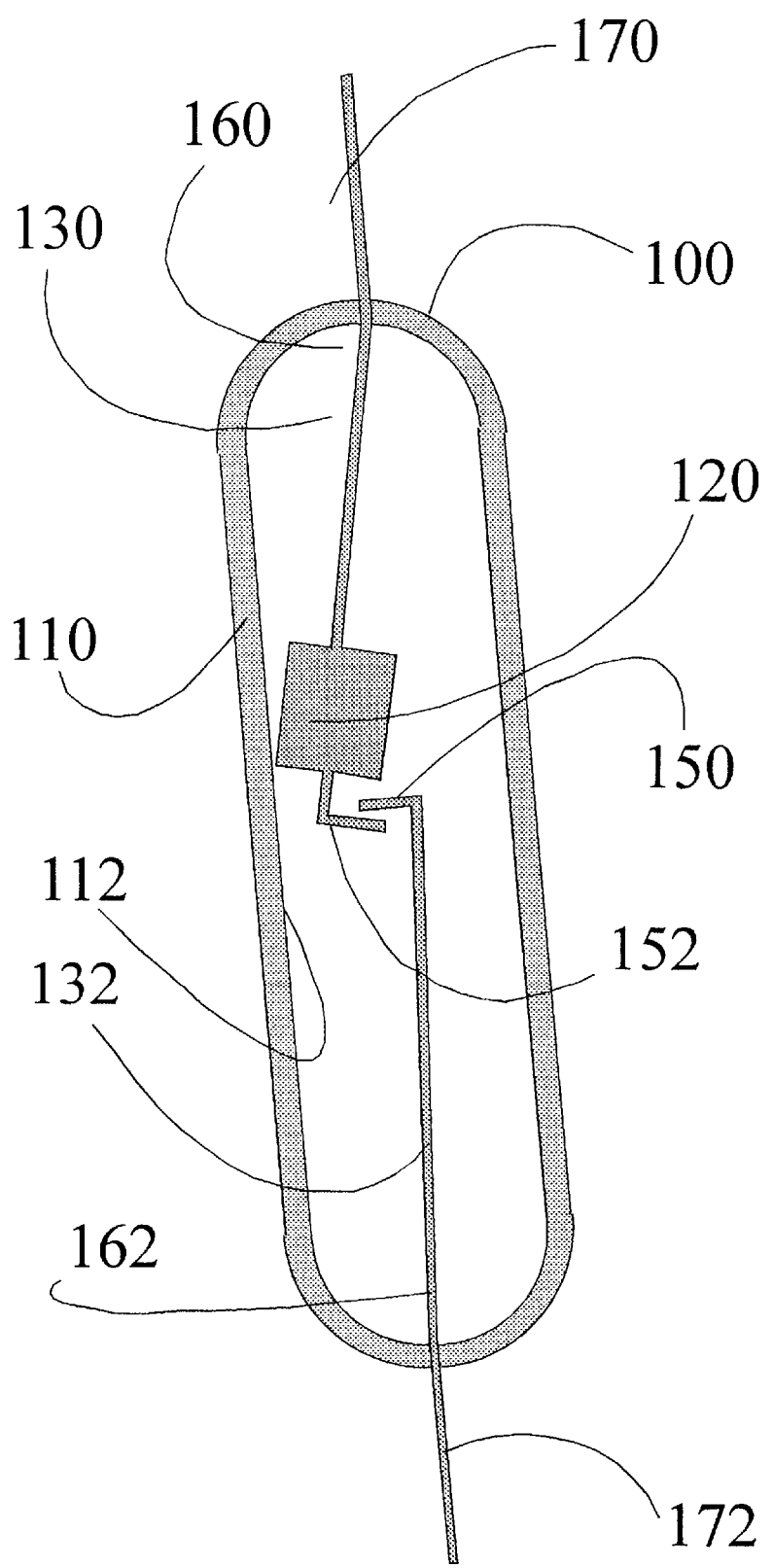
FIG. 2C is a cross sectional view of the apparatus of FIG. 1 taken along lines 2—2 shown in the non-actuating position with the seismic mass resting against a wall of the switch housing.

FIG. 2C is a view similar to FIG. 2B with the tilt switch rotated in the opposite or non-actuation direction. In this case, the tubular wall 112 in the middle portion of the housing 110 prevents the seismic mass 120 from rotating more than a small angle. The ends of the housing 110 are dome-shaped to thereby close the interior of the housing 110.

Figure 2D:
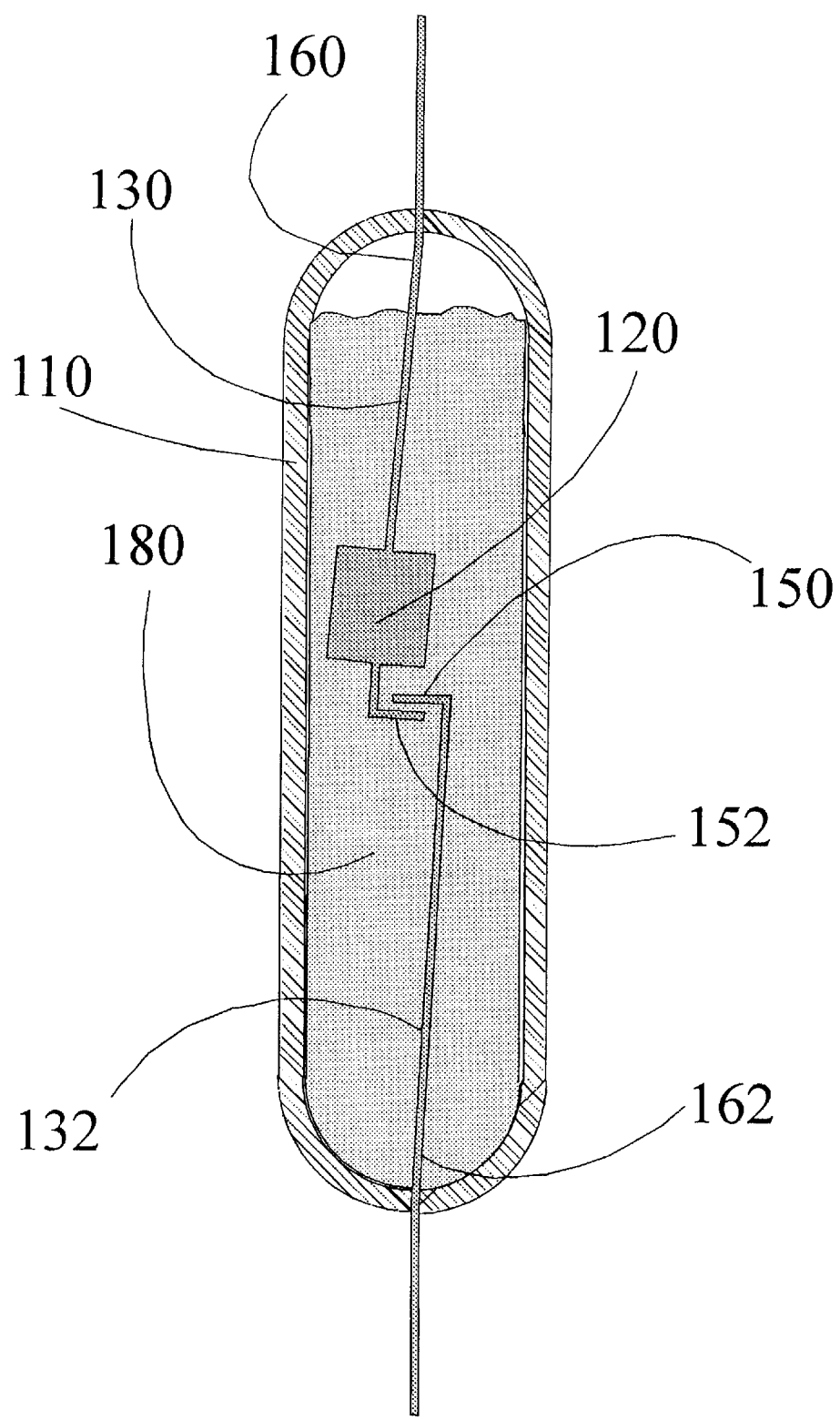
FIG. 2D is a cross sectional view of the apparatus of FIG. 1 taken along lines 2—2 shown in the non-actuating position with the switch partially filled with a damping liquid.

FIG. 2D illustrates the use of a damping medium such as a fluid 180 to dampen the motion of seismic mass 120. If the tilt switch is in a position such as shown in FIG. 2A, slight vibrations could cause the seismic mass 120 to cause the beam 130 to rotate about the hinge 160 and intermittently cause the contacts 150 and 152 to engage one another. Such intermittent contact closures could have detrimental effects on equipment such as compressors. For this reason, mercury tilt switches are normally provided with a mounting configuration that provides hysteresis such that once the contacts have closed, an adverse tilt of a minimum angle is required to open the switch. Naturally, a similar mounting system could be used with the mechanical tilt switch described herein. The effects of vibration, however, can also be mitigated through the use of damping fluid 180 which substantially fills housing 110 of the mechanical tilt switch of this invention. Fluid 180 reduces the effects of vibration significantly below that achieved with mercury switches by dampening the motion of the seismic mass 120 and the beams 130 and 132. The fluid 180 or other damping medium, if properly chosen, has the added advantage of suppressing arcs between the contacts 150 and 152 while the contacts are in the process of engaging or disengaging. Fluid 180 has a substantially higher breakdown voltage than gas, thus substantially reducing the separation distance required before sparking is eliminated.

Many different fluids would operate in the fashion described above, however, one preferred fluid is a silicone oil. Another preferred fluid is any fluid from the class of transformer fluids such as polychlorinated biphenyl (PCB), a common transformer fluid having good dielectric properties. Sometimes a small amount of a reducing agent can be added to the fluid to reduce the buildup of oxides or other undesirable films on the surfaces of contacts 150 and 152 further reducing their contact resistance.

Figure 3B:
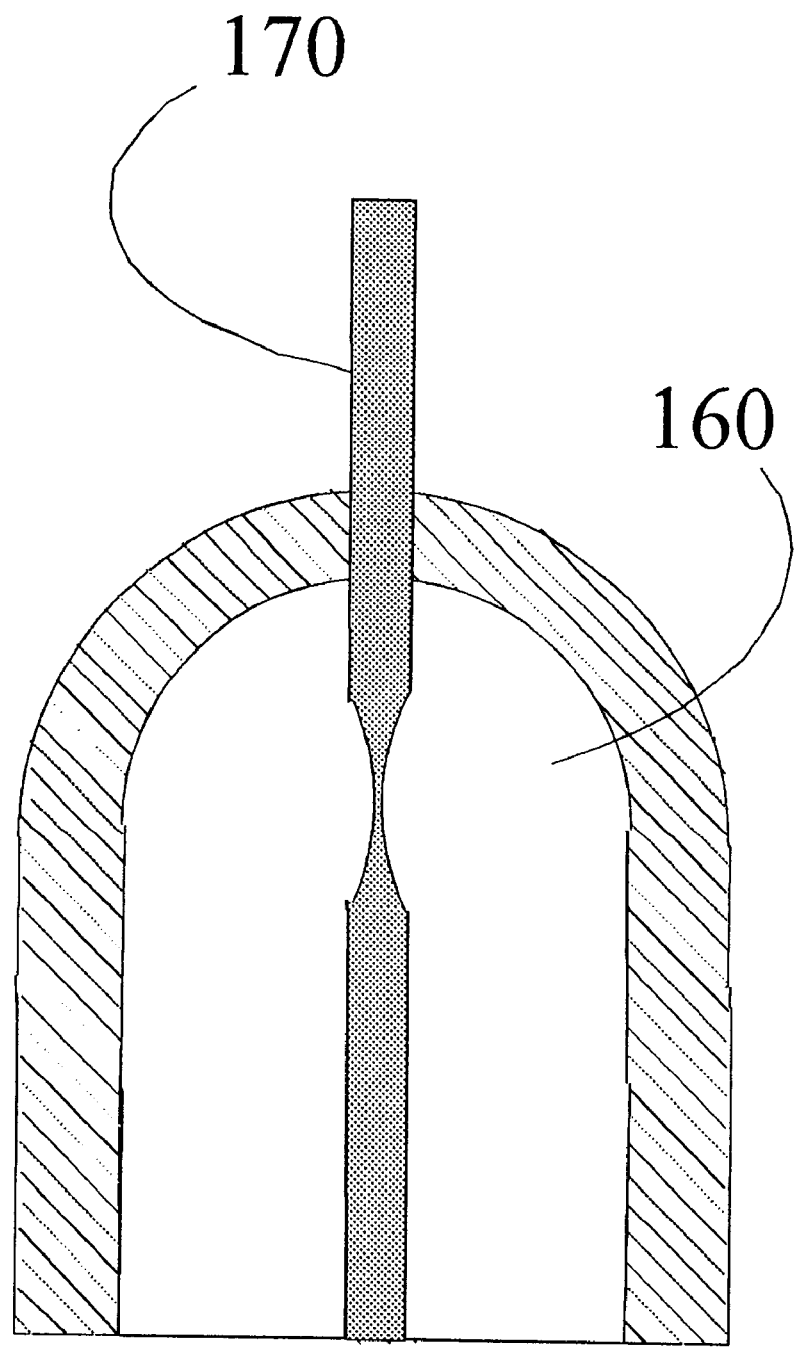
FIG. 3B is a cross sectional view of the hinge section of the apparatus of FIG. 3 taken along lines 3B—3B.

FIG. 3A is a view of the apparatus shown in FIG. 1 taken in the direction 3—3. Hinge portions 160 and 162 in beams 130 and 132 respectively are shown in this view and are created by a stamping or coining operation which reduces the thickness of the beams 130 and 132 forcing the excess material to be displaced laterally. Thus, the beam is substantially weakened for bending at the hinge locations without reducing the amount of material available for the conduction of the electricity through the beams 130,132 when an electrical circuit is completing therethrough. Naturally, in other applications, the excess material could be removed. The thickness of the hinge 160 and its variation can be more easily seen in FIG. 3B.

Figure 4A:
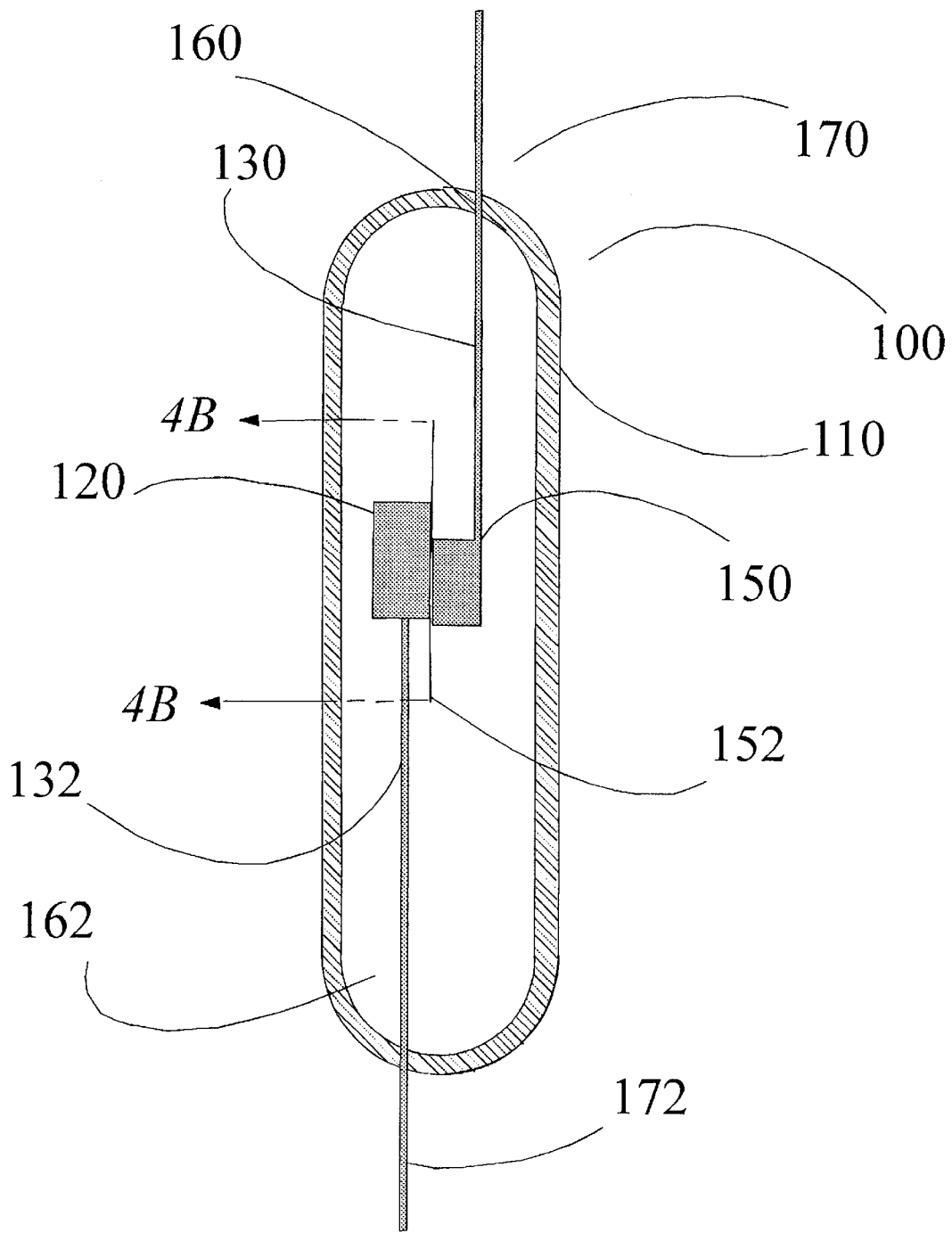
FIG. 4A is a cross sectional view of a modification of the apparatus of FIG. 1 taken along lines 2—2 but with a different contact arrangement and where one of the contacts has a plating containing diamonds in a gold matrix.

FIG. 4A shows a tilt switch similar to that illustrated in FIGS. 1 through 3B without the mechanical advantage feature. In this case, a surface of the contact 150 has been plated with abrasive particles put in a soft conductive matrix. At least two patents have issued on the general process of using diamonds for coating conductors. They are U.S. Pat. Nos. 4,804,132 and 5,083,697, both to Louis DiFrancesco and both are hereby included herein by reference. According to the teachings of these patents, the abrasive particles 190 are held in a gold matrix 192 in the configuration of FIG. 4A and FIG. 4B which shows an enlarged view taken along lines 4B—4B of FIG. 4. The abrasive particles are typically made from industrial diamond powder. The powder is first made conductive by a process such as sputtering and plated on the surface of contact 150 through a known plating process.

The preferred abrasive particles used in this invention are diamonds. However, other abrasive particles such as silicon carbide or aluminum oxide could also be used without deviating from the scope and spirit of the invention. It has been found that the combination of a soft plating material such as gold and the very hard abrasive particles such as diamonds results in a contact resistance approximately ⅛ that of the conventional gold plating. As a result, the size of the seismic mass required to achieve a particle contact resistance is also reduced by a factor of about 8. This once again permits the construction of a mechanical tilt switch that is substantially smaller than would otherwise be possible. Also, the seismic mass 120 in FIG. 4A can be made from tungsten, or other heavy material, which has a specific gravity of about 2.4 times that of steel, giving an added factor of 2.4 to reduce the size of the switch.

Naturally the combination of the plating system shown in FIG. 4A and the mechanical advantage shown in FIGS. 1 through 2D results in a mechanical tilt switch where the seismic mass is reduced by as much as a factor of 80, or almost 200 if tungsten is used, over that which would be required without these features. This combination permits the construction of miniature mechanical tilt switches which are comparable in size to currently produced mercury tilt switches without the use of mercury.

Figure 4B:
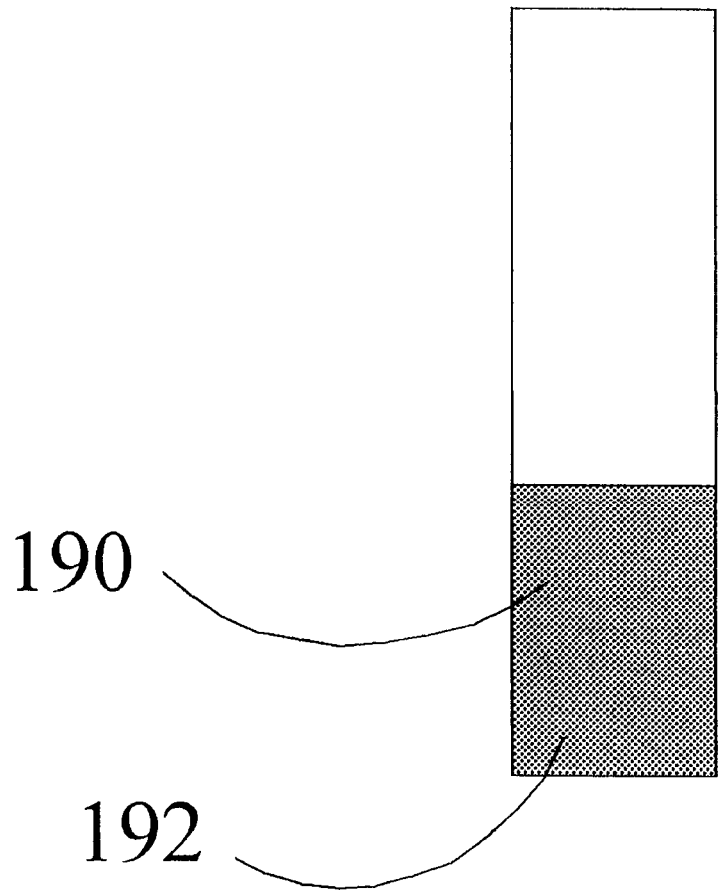
FIG. 4B is an enlarged view of the plating on one of the contacts taken along line 4A—4A of FIG. 4.
Figure 5:
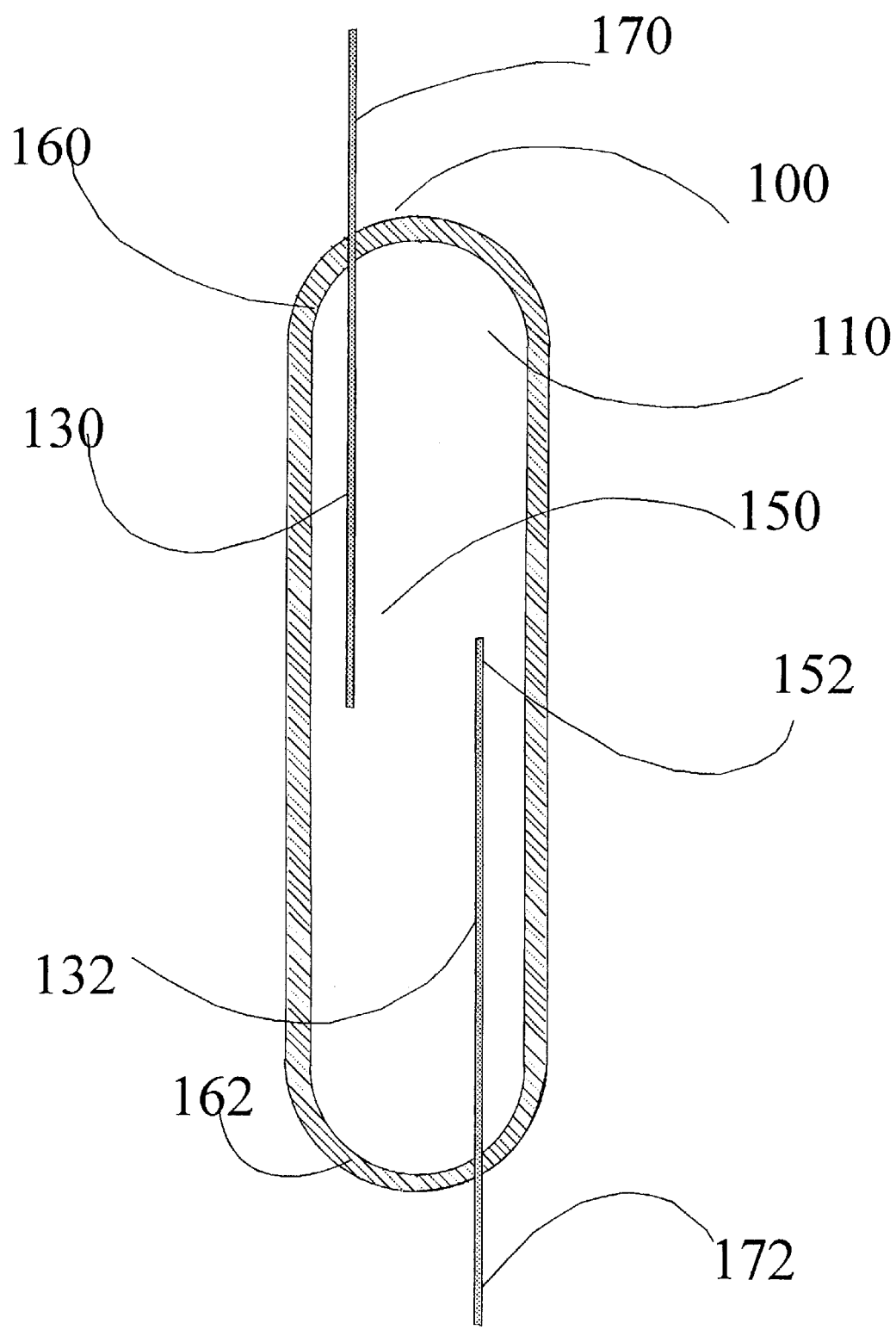
FIG. 5 illustrates the application of the teachings of this invention to a reed switch.

The teachings of this invention can also be applied to conventional reed switches as shown in FIG. 5. Due to the very small contact force present in conventional reed switch designs, the contact resistance is substantially higher than mechanical switches. In one application, for example, where a reed switch is used as part of an automobile crash sensor for use with airbags, this high contact resistance causes the reeds to weld together when the current which is required to fire an airbag is passed through the switch. Through the implementation of the teachings of this invention, this contact resistance could be substantially reduced either through the use of the mechanical advantage technique shown in FIGS. 1 through 3 or the gold and abrasive particle configuration shown in FIG. 4B. This is shown in FIG. 5 where one or both of the contacts 150 and 152 are plated with abrasive particles in a soft conductive matrix.

Figure 6A:
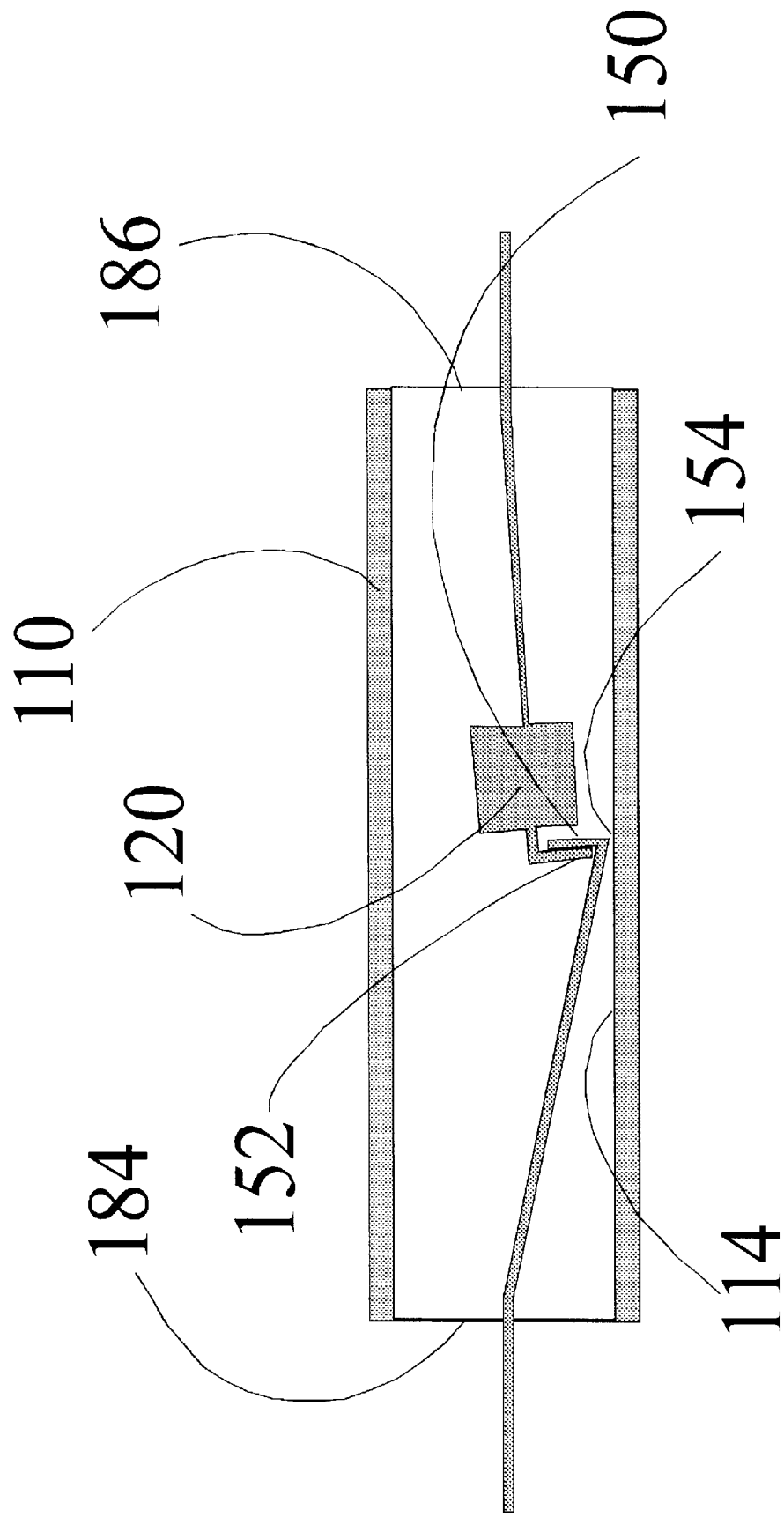
FIG. 6A illustrates the first step of one possible manufacturing sequence for making a preferred embodiment of the tilt switch of this invention where the contacts have been inserted into a section of glass tubing.
Figure 6B:
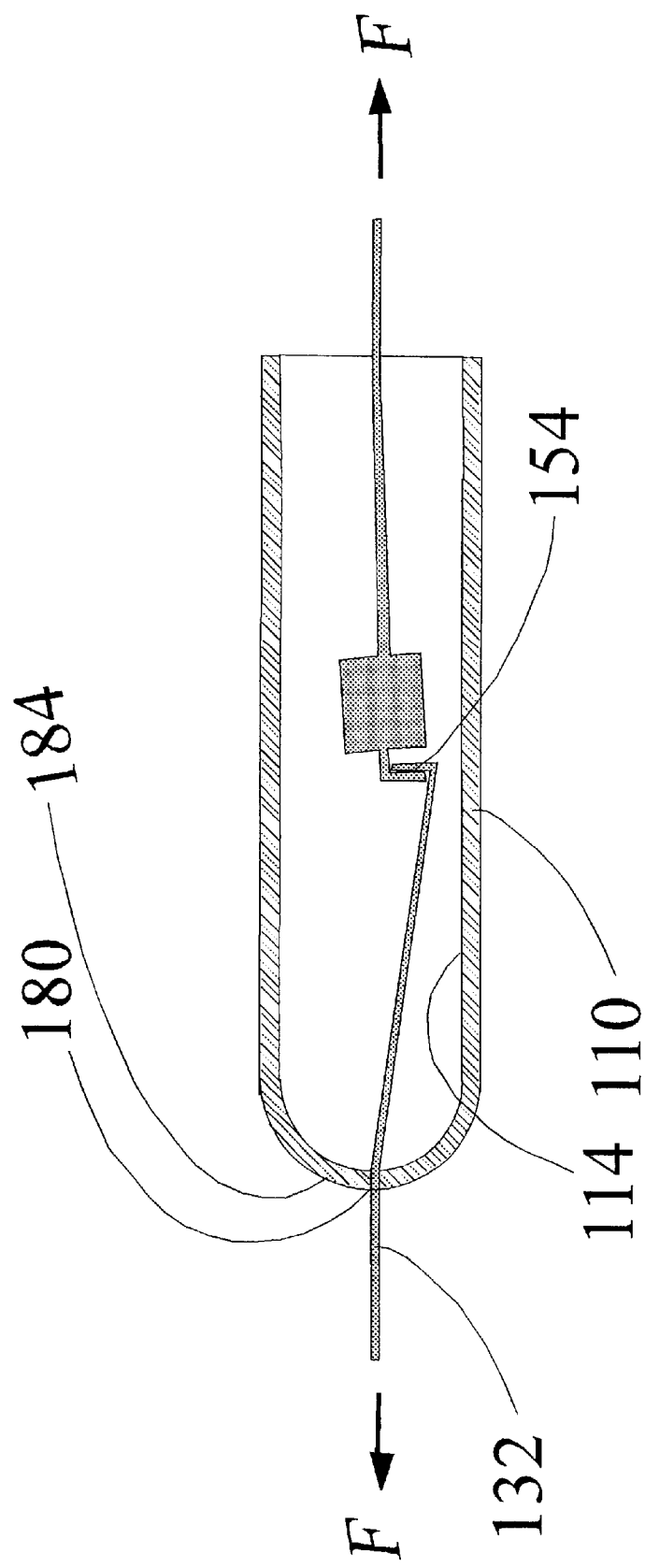
FIG. 6B illustrates the second step of one possible manufacturing sequence for making a preferred embodiment of the tilt switch of this invention where the contacts have been inserted into a section of glass tubing and one end of the tubing has been sealed and tension has been applied to the ends of the contact leads.
Figure 6C:
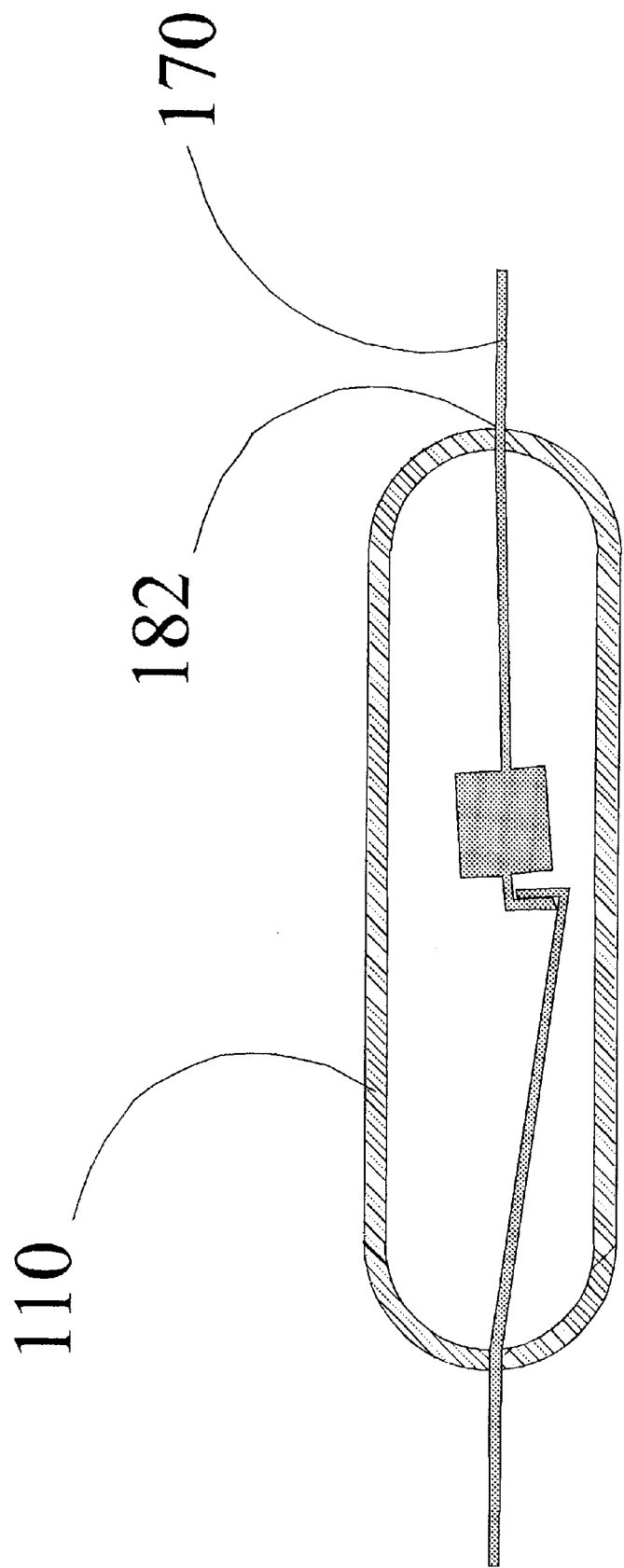
FIG. 6C illustrates the third step of one possible manufacturing sequence for making a preferred embodiment of the tilt switch of this invention where the contacts have been inserted into a section of glass tubing and both ends of the tubing has been sealed and the tension has been released.

FIGS. 6A through 6C illustrate the steps of a preferred manufacturing sequence used to create a preferred embodiment of the tilt switch of this invention. The beams 130 and 132 are formed using conventional stamping and metal forming equipment. Seismic mass 120 is attached to the beam 130 by means of staking, gluing, soldering or other convenient joining process. Contacts 150 and 152 are then engaged and the beam mass and contact assembly is placed inside of a glass tube 110A as shown in FIG. 6A. A spherical end 184 of the tube 110A is then formed by heating the glass causing it to seal around lead 172 of beam 132. In this manner, a seal 180 is formed between the spherical end 184 of the tube 110A and the beam 132 as shown in FIG. 6B. In FIG. 6A, edge 154 of contact 150 is resting against a inner surface of a tubular wall 114 of housing 110 and is lifted off wall 114 when sufficient force is applied to leads 170 and 172.

The force F on leads 170 and 172 is now increased until edge 154 is lifted off of wall 114 as shown in FIG. 6B. At this point the glass at end 186 of tube 110A is heated and formed, and in a similar manner, the seal 182 is formed between tube 110A and lead 170 as shown in FIG. 6C to thereby form the closed housing 110.

This entire manufacturing process is done with the tilt switch in the horizontal position as shown in FIGS. 6A through 6C. In this manner, when the switch is in use, the edge 154 will never touch the housing and the entire force created by tilting the switch is available to be amplified and translated into a contact force between contacts 150 and 152. Also, by this process a precise gap is assured between contacts 150 and 152 when the switch is vertical and in the open state.

Naturally the same manufacturing processes could take place with the device at some other tilt angle between the actuation desired tilt angle and the horizontal with similar benefits. Also, although the process was described using glass for the housing, a similar process exists for the case where the housing is made from plastic.

In the manufacturing process illustrated in FIGS. 6A through 6C, tension was maintained on leads 170 and 172 in order to ensure that contacts 150 and 152 remain engaged. An alternate process would be to put a minute amount of adhesive between the contacts which could later be evaporated or otherwise removed when the initial current is passed through the switch. Naturally other manufacturing steps or variations of the above sequence are possible.

In the tilt switches illustrated thus far, only a component of the force of gravity acting on the seismic mass is available to create a contact force. Also, in the tilt switches illustrated thus far, the switch requires mounting with its housing primarily in the vertical direction. Most mercury switches operate with the housing primarily in the horizontal direction. Both of these features can be accomplished using a rolling mass in place of the pivoted mass in the embodiments illustrated thus far. One example of such an embodiment is shown generally at 200 in FIG. 7. In this case, a spherical mass 220 is utilized which rolls in housing 210. For non-actuation angles, mass 220 rests on surface 213 of insulator 212. Insulator 212 can be part of housing 210 or a separate part. Beam contact 230 is also attached to insulator 212 in such a manner that it can rotate about the attachment element 242. Contact beam 232 is similarly attached to the housing by means of an attachment element 241.

Figure 7:
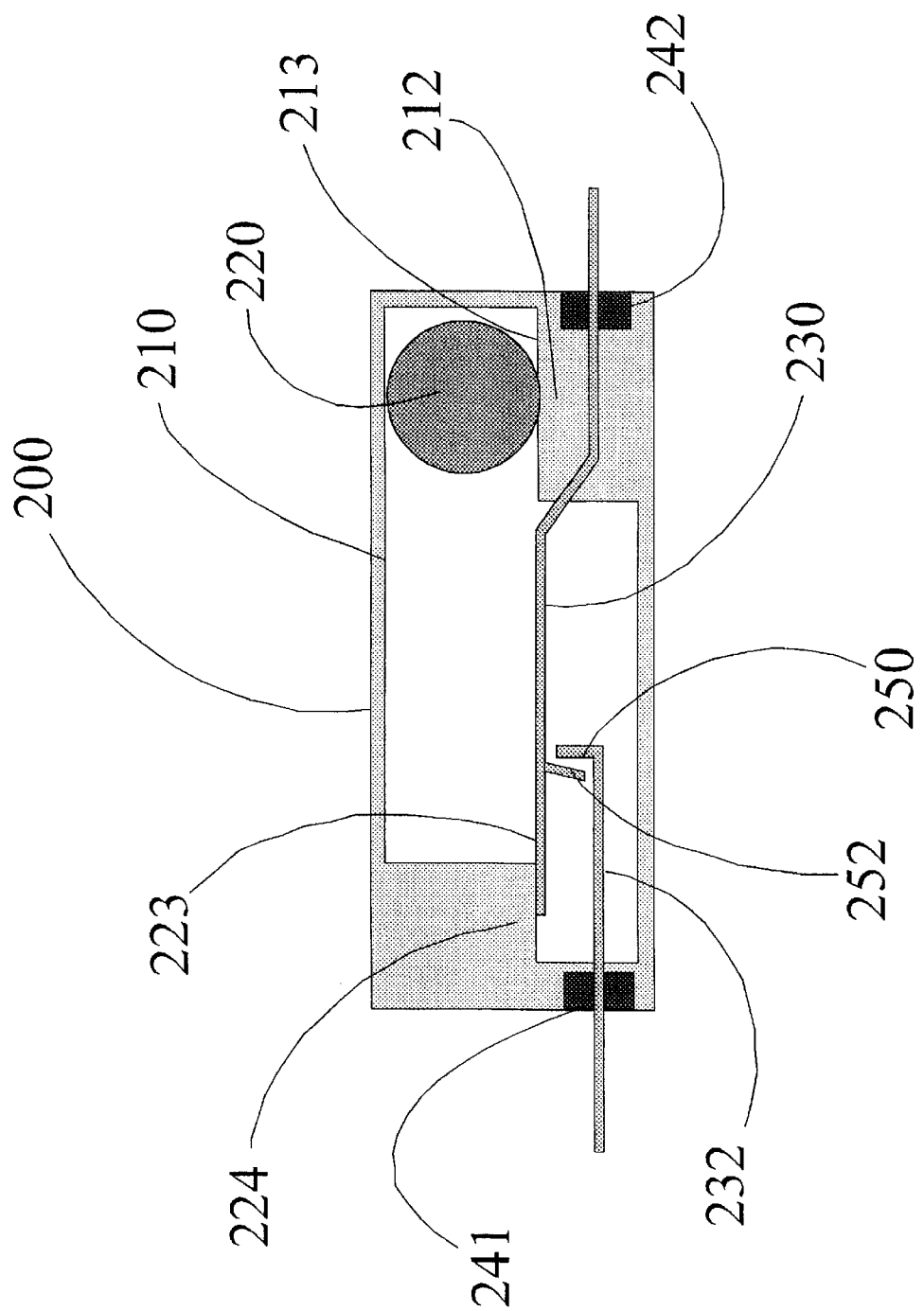
FIG. 7 is a cross sectional view of a horizontal implementation of the teachings of this invention where the seismic mass is a rolling ball.

When the tilt switch rotates counter-clockwise in FIG. 7, mass 220 rolls toward end 223 of contact beam 230 at which point its entire mass is acting on contact beam 230 causing it to tilt downward and similarly causing contacts 250 and 252 to engage. This engagement creates the same mechanical amplification as illustrated in the examples of FIGS. 1 through 3. The mass 220 in this case, however, can be substantially smaller than the mass 120 in the previous examples since the entire force of gravity acting on this mass 220 creates a contact engagement force. The mass 220 can also be manufactured from a heavy material such as tungsten or uranium.

In this implementation, contact 230 is slightly biased upward so that in the non-activated position it rests against insulator 224 that can be a separate part of housing 210.

Naturally, abrasive particles could also be placed on one or both of the contact surfaces 250 and 252, as described above, further reducing the contact resistance and therefore permitting even a smaller mass 220 to be utilized. In this manner a miniature mechanical tilt switch can be effectively created. Such a switch would be comparable in size to currently used mercury switches and since the housing is primarily mounted horizontally, it can be used as a direct replacement for current mercury switches.

In all of the examples illustrated so far, the leads have protruded from opposite ends of the sensor housing. Many mercury switches have both leads coming out of the same end which can be easily accomplished in the design of FIG. 7, for example by reversing the direction of beam 232 to cause it to protrude from the right end portion of the housing.

Figure 8:
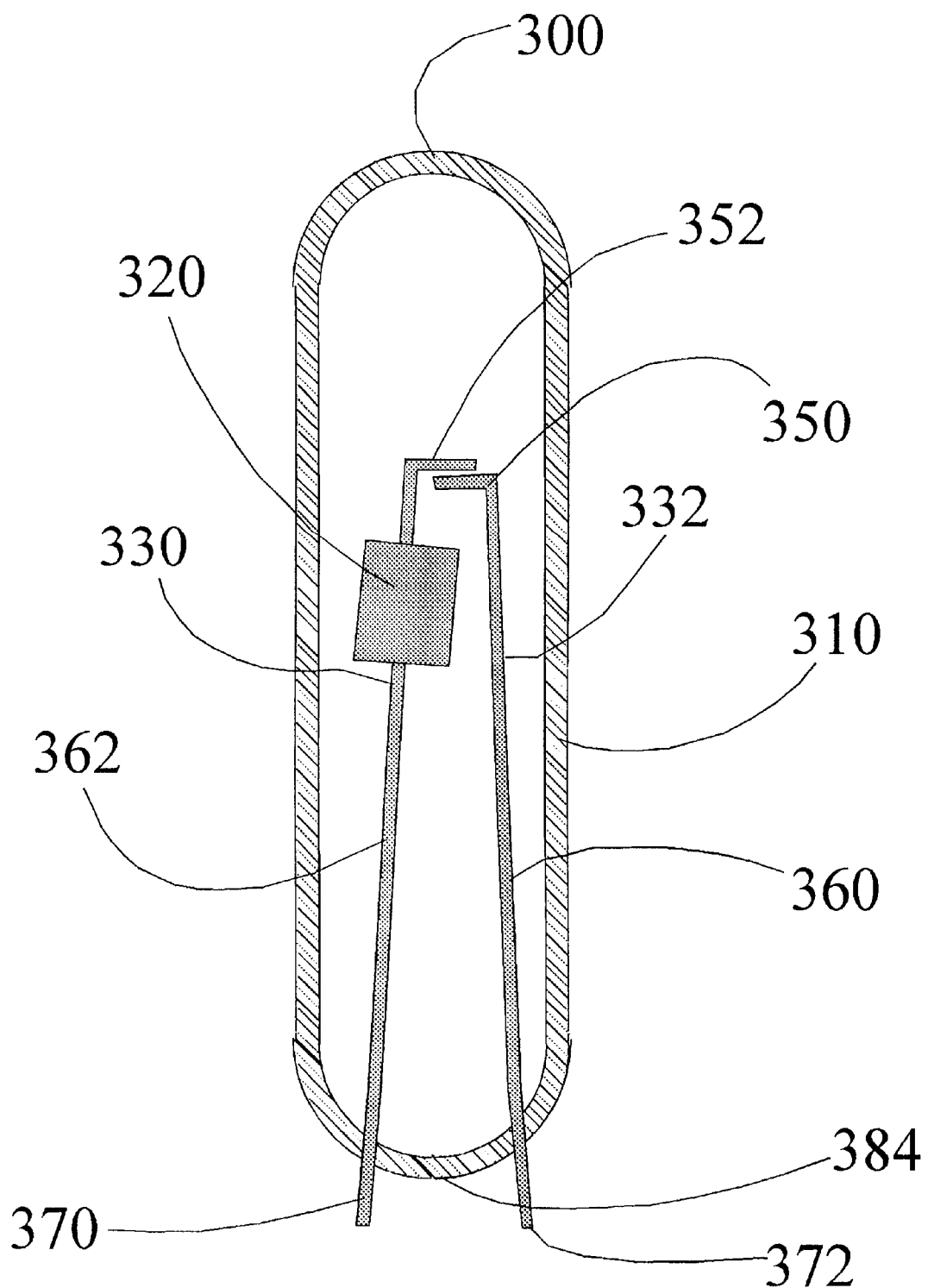
FIG. 8 is a cross sectional view of another implementation of the tilt switch built according to the teachings of this invention where both contact leads emerge from the same end of the switch housing.

Another example of a tilt switch where both leads emanate from the same end of the housing is illustrated in FIG. 8. In this illustration, beam 332 is now in compression whereas beam 330 remains in tension when contacts 350 and 352 engage in a similar manner as described above. In other aspects, the switch illustrated in FIG. 8 performs in the same manner as that illustrated in FIGS. 1 through 3. The switch is shown generally at 300 and comprises switch housing 310 and beams 330 and 332. These beams have hinges 360 and 362 respectively and leads 370 and 372 respectively. Seismic mass 320 is acted upon by gravity when the switch is turned clockwise by a sufficient amount.

Figure 9:
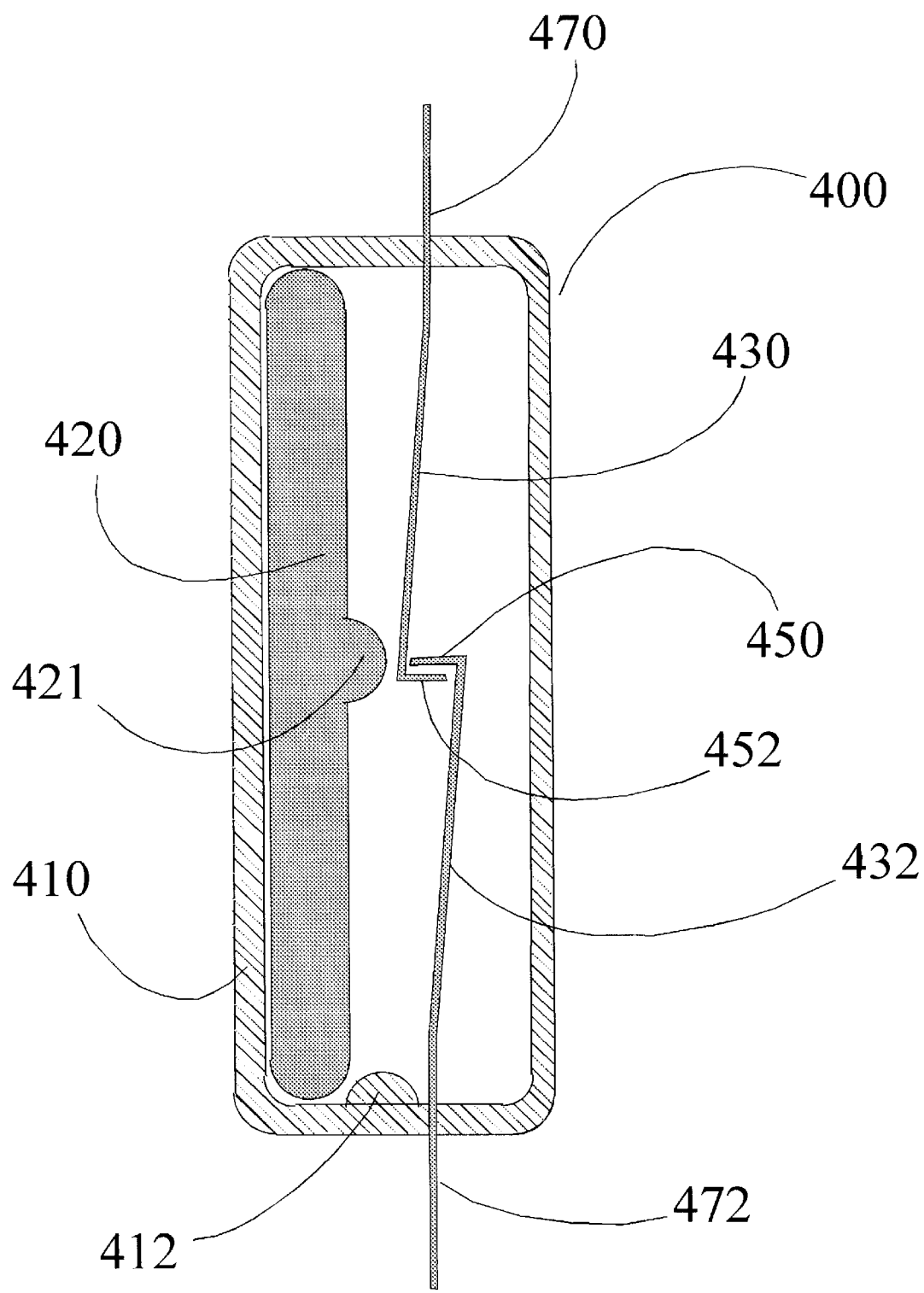
FIG. 9 is a cross sectional view of an alternate preferred embodiment where the seismic mass is separate from the contacts and is constrained to rotate in the switch housing.

FIG. 9 illustrates one of many possible examples where the seismic mass is not attached to the switch beams. Rather, in this case, the switch is shown generally at 400 and seismic mass 420 is held in housing 410 and constrained to rotate due to protrusion of 412. A projection 421 from mass 420 is aligned to interact with contact 452 forcing it to engage contact 450 when the switch is rotated clockwise in FIG. 9. In this case, the beams 430 and 432 do not contain weakened or hinged sections and the flexure of the beams themselves act as hinges. Since the beams do not have to support the weight of the seismic mass, they can be substantially weaker. The configuration shown in FIG. 9 has the advantage that substantially more mass 420 is available since it does not need to be supported by one of the contact beams. This also substantially reduces the effect of vibrations on the beam 430. For these reasons, the design shown in FIG. 9 will most likely results in the smallest design of the vertically mounted switch examples shown here.

Figure 10:
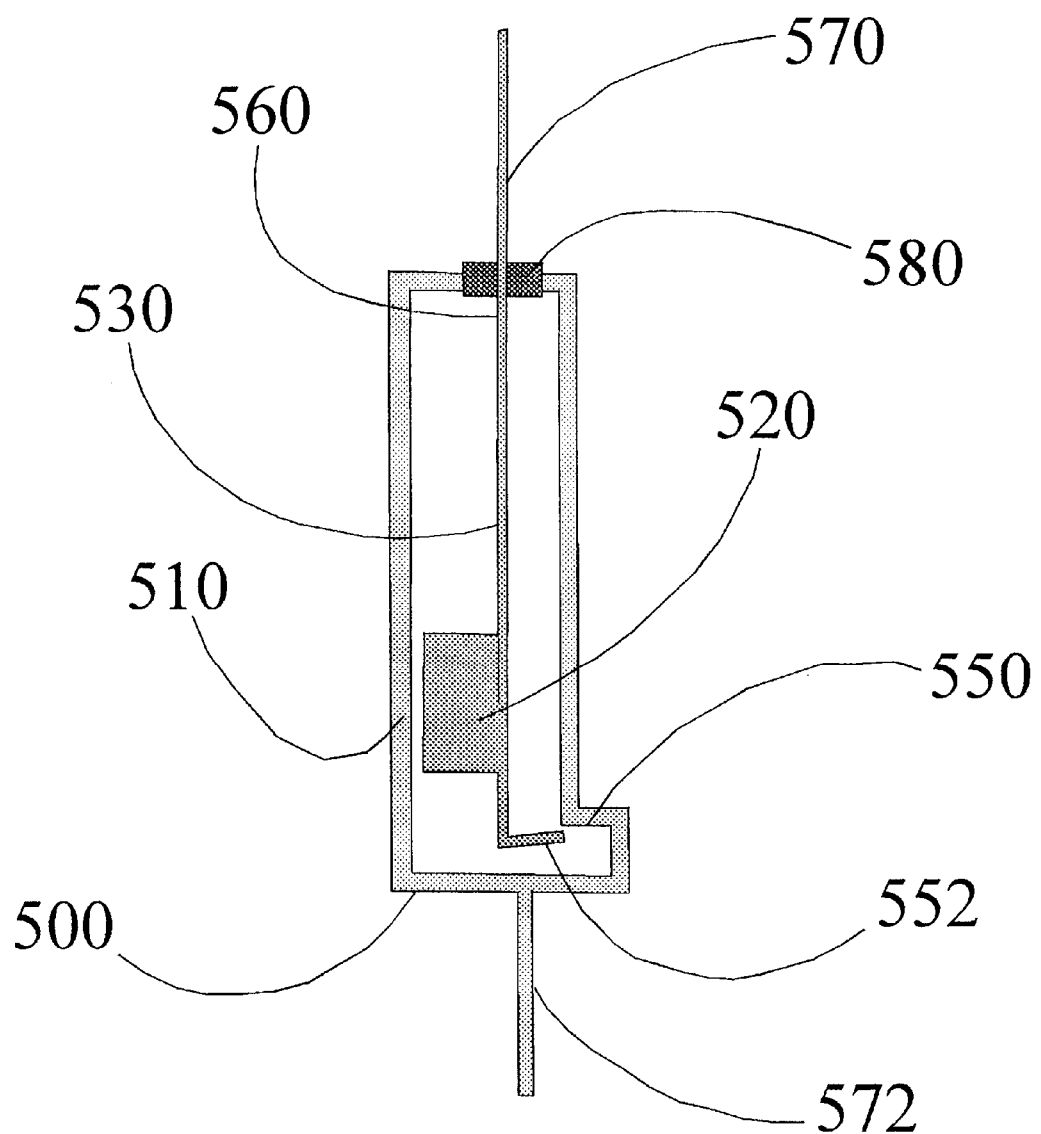
FIG. 10 is a cross sectional view of yet another preferred embodiment where the housing is used as one of the electrical contacts.

In some cases, it is desirable to use the housing itself as one of the conductors. An example is illustrated in FIG. 10 where housing 510 is now constructed of metal instead of plastic or glass as preferred in the previous examples. Contact beam 530 however now must be insulated from housing 510 which is accomplished by means of an insulating sealing member such as 580. Such a sealing member can be obtained as a standard glass to metal header seal. In this case, the sensor that is shown generally at 500 contains a housing 510 which is formed partially into a contact at 550. Contact 550 is engaged by contact 552 when the switch is rotated clockwise in FIG. 10.

Figure 11:
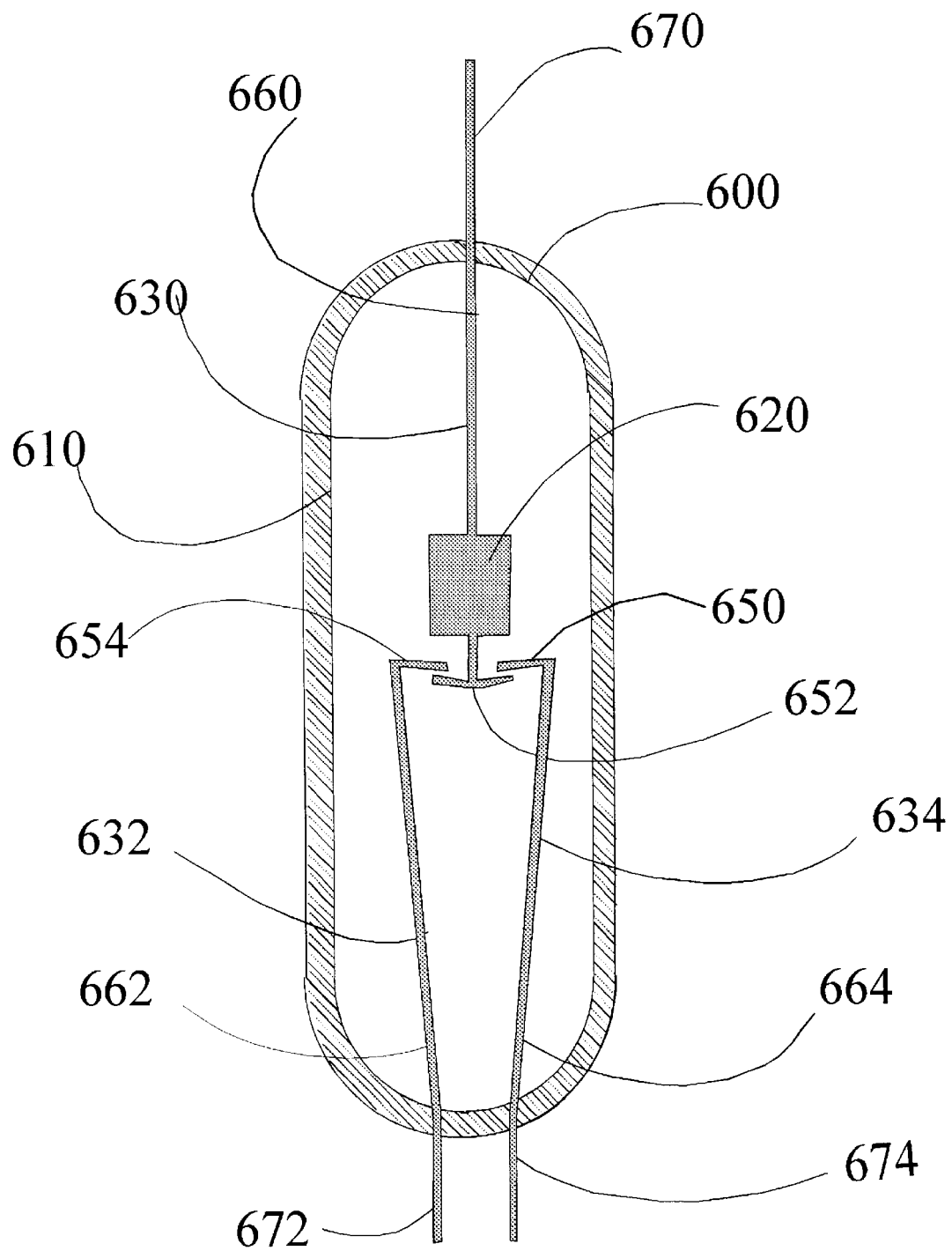
FIG. 11 is a cross sectional view of a preferred embodiment where the switch activates one circuit for a clockwise tilt and a second circuit for a counterclockwise tilt.

In the illustrations of FIGS. 1 through 10, a single pole switch has been illustrated. In FIG. 11, a dual pole switch is shown wherein one circuit is closed for a counter-clockwise rotation and a different circuit for a clockwise rotation. This device shown at 600 contains a housing 610 that can be made of an insulating material such as plastic or glass. Attached to the housing are beams 630, 632 and 634. Each of these beams contains a hinged section 660, 662 and 664 respectively and a lead 670, 672 and 674 respectively. This switch is designed such that a clockwise motion of the tilt switch as shown in FIG. 11 causes contact 652 to engage contact 650 and a counter-clockwise rotation would cause contact 652 to engage contact 654.

Figure 12:
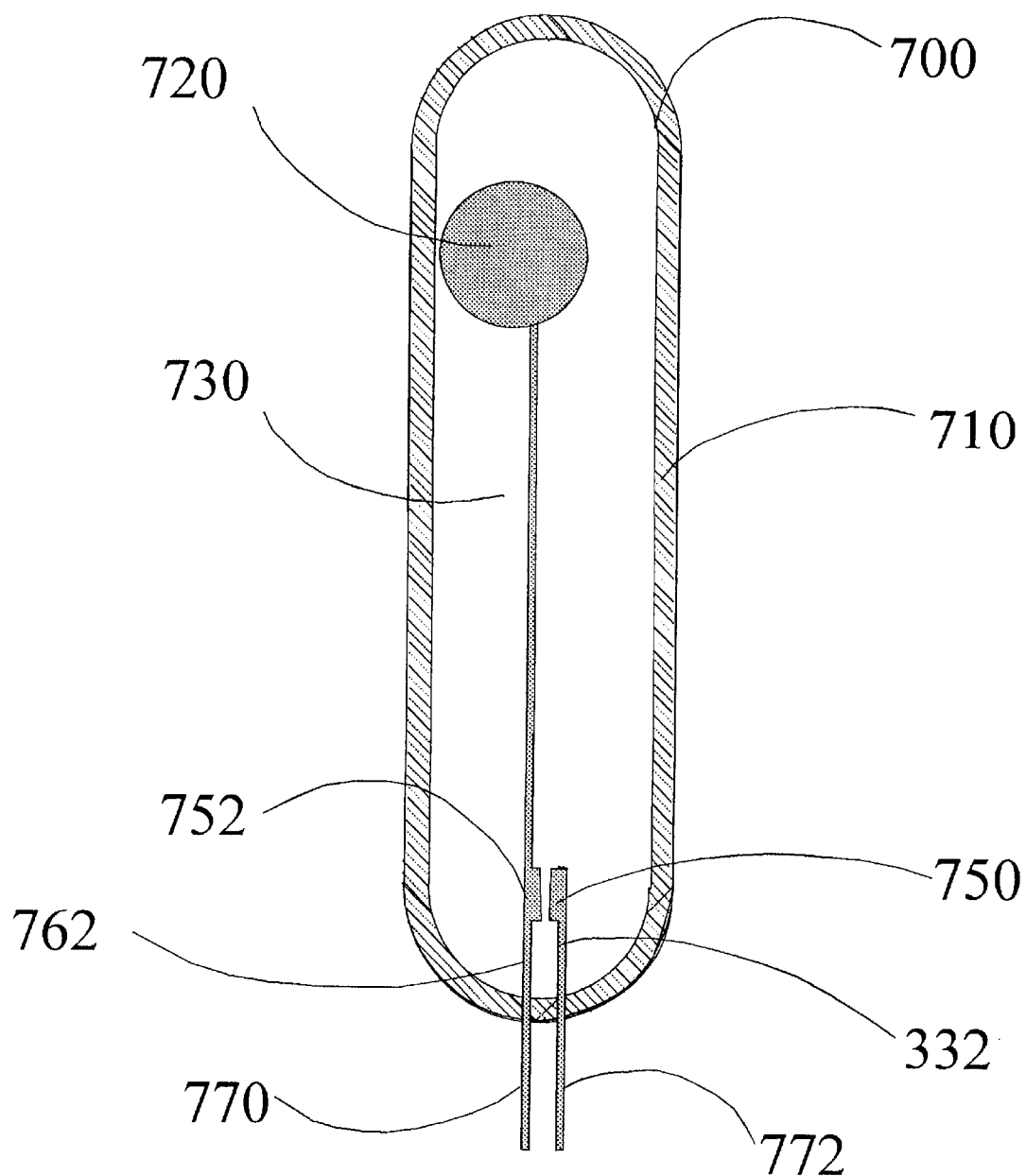
FIG. 12 is a cross sectional view of another preferred embodiment where the mechanical advantage is obtained through a difference in the lengths of the switch lever arms.

The force amplification methods illustrated so far have utilized the large tension created in the beams by a mass coupled with a small angular deflection of the beams to create the mechanical advantage. An alternative design is shown generally as 700 in FIG. 12 where the seismic mass 720, which is mounted on beam 730, is located at a substantial distance from the pivot or hinge 762. The contact 750 and 752 now are in a parallel configuration and at a much smaller radius than the seismic mass at 720. When the switch of FIG. 12 is rotated in the clockwise direction, the torque exerted by seismic mass 720 about hinge 762 is equal to M G L sin $\square$ where M is the mass of 720, G is the acceleration of gravity, L is the length of beam 730 from hinge 762 to the center of mass 720, and $\square$ is the angle of rotation. To oppose this torque, a force is created between contact 750 and 752 which is equal to (L/X)(M G sin $\square$), where X is the distance from the point of engagement between the contacts 750 and 752 to hinge 762. If L is large compared to X, a significant magnification of the force results permitting a reduction in the required mass 720.

In order to provide a minimum contact force and to prevent intermittent contact closures at the marginal tilt angle, mercury switches are frequently mounted flexibly such that when the mercury flows from one side of the switch to the other, the added mass of the mercury increases the tilt angle of the switch. This provides a hysteresis effect to the switch. In the case of a thermostat for example, the angle required to turn on a furnace or air conditioner would be slightly different from the angle required to turn off the device. This would translate into the case of a furnace, for example, where if a thermostat was set at 70 degrees, the furnace would go on when the temperature dropped below 69 degrees and turn off when the temperature reached 72 degrees. The width of this hysteresis zone in this case is 3 degrees. That of course could be varied for different applications.

Figure 13A:
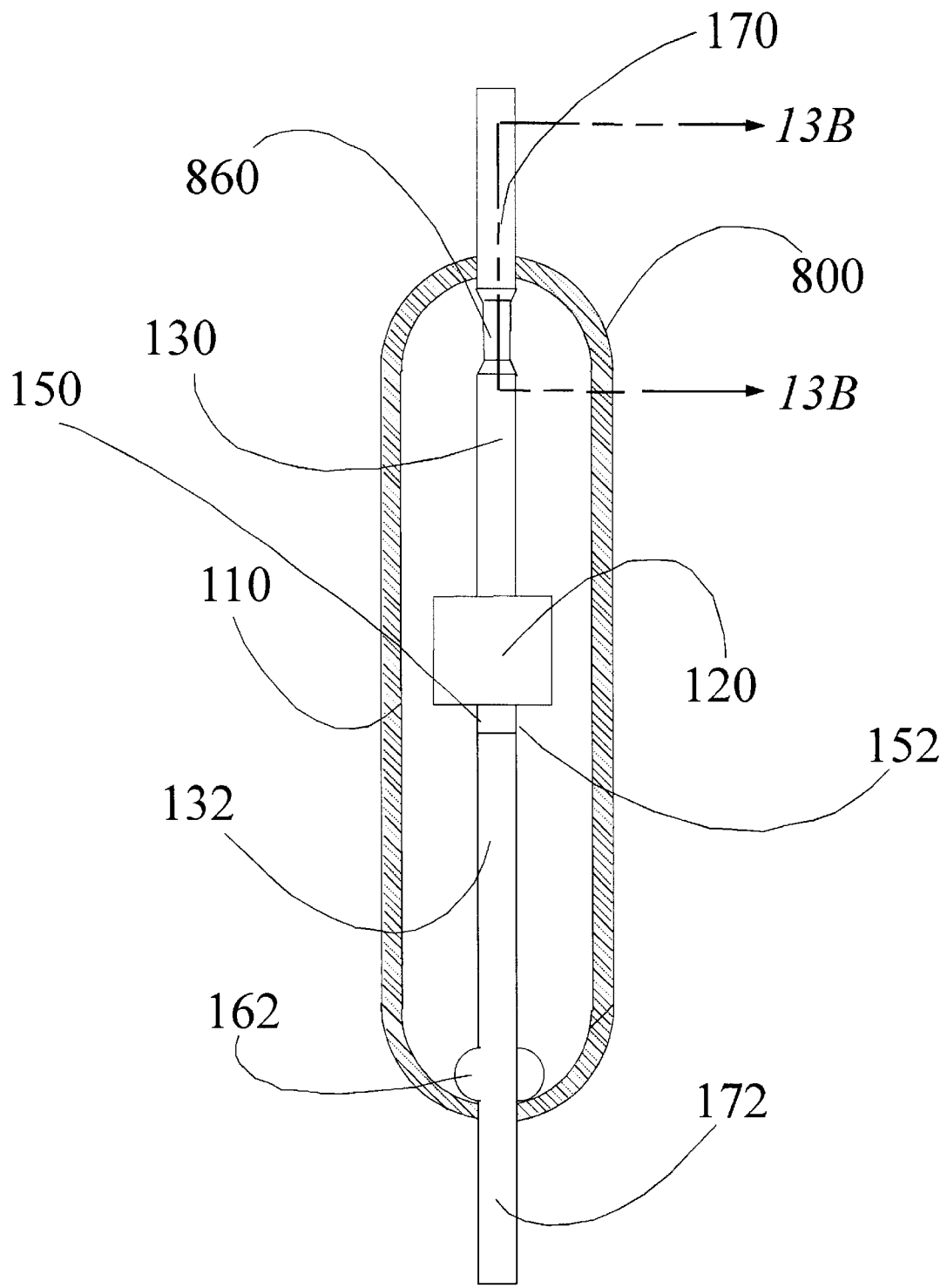
FIG. 13A is a cross sectional view of one of many possible snap through mechanisms which can be incorporated into the switch.
Figure 13B:
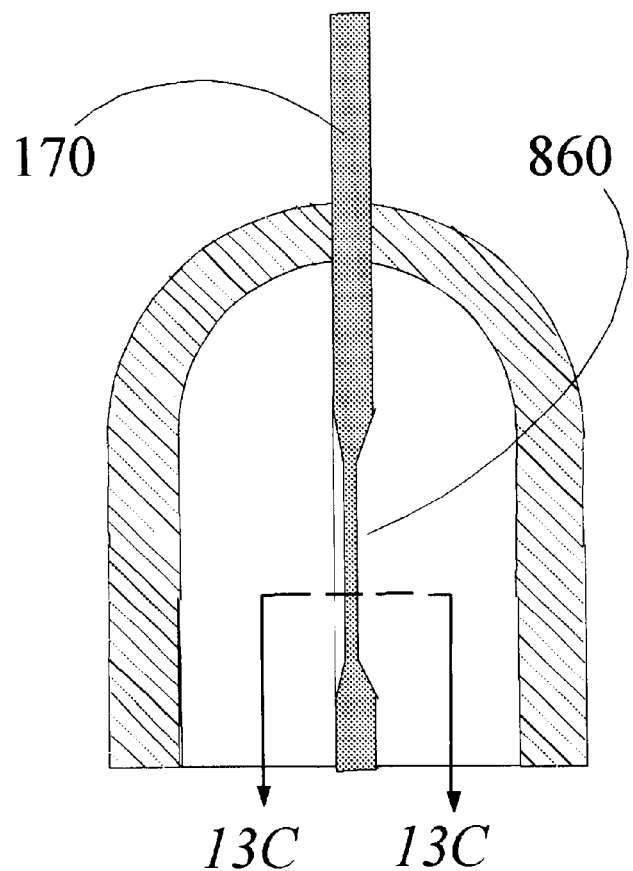
FIG. 13B is an enlarged view of the snap through hinge mechanism of the tilt switch of FIG. 13A taken along line 13B—13B.

A similar hysteresis effect will take place in the tilt switches disclosed herein if they are similarly mounted on flexible structures. Alternately, a snap action effect can be designed into the switch itself as illustrated in one example which is shown generally at 800 in FIGS. 13A, 13B and 13C. In this case, a hinge 860 of beam 130 would be slightly longer and have a curved cross-section. An enlargement is shown in FIG. 13B which is a view of the switch taken along lines 13B—13B of FIG. 13A and in FIG. 13C which is a view of the cross-section of the hinge 860 taken along the lines 13C—13C of FIG. 13B. In this configuration, when the seismic mass 120 rotates causing contacts 150 and 152 to engage as described above, the rotation will be opposed by the requirement that hinge 860 buckle in a manner similar to that which occurs when a metal tape measure is bent. This creates a snap through feature which requires a significantly larger force to initiate bending of beam 130 until a threshold has been exceeded at which point the force opposing the bending caused by the hinged 860 suddenly drops. In this manner, the contacts are maintained at a minimum separation distance until the actuation tilt angle is exceeded at which point, the contacts rapidly engage thus minimizing arcing effects.

Figure 13C:
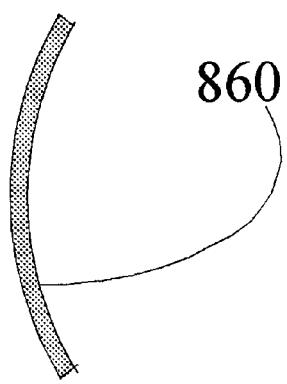
FIG. 13C is another further enlarged view of the snap through hinge mechanism of the tilt switch of FIG. 13B taken along line 13C—13C.
Figure 14:
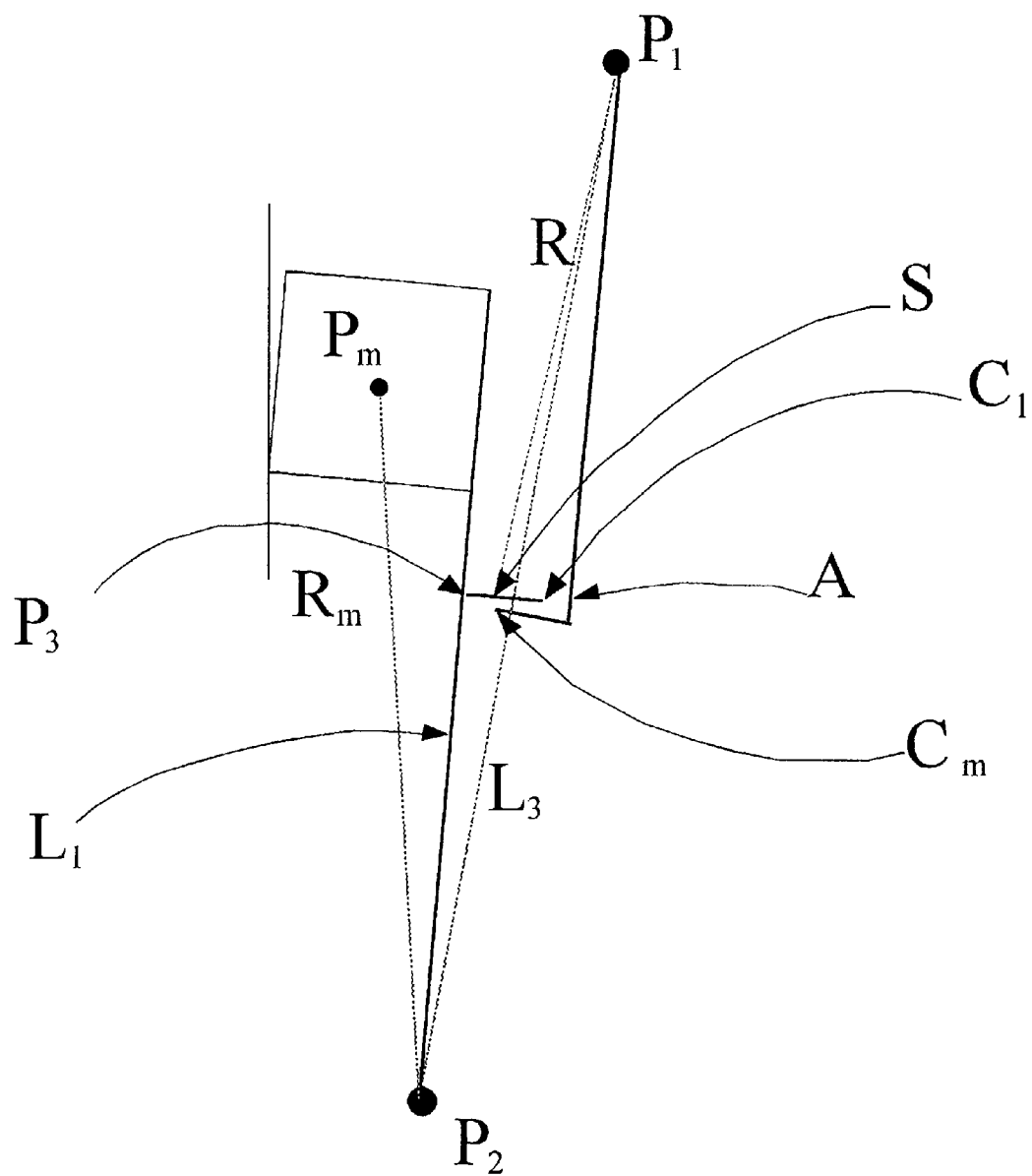
FIG. 14 is a schematic showing various geometric parameters of an alternate version of the tilt switch of this invention.

Naturally many other snap action designs could be incorporated into the switch designs described above. A particular design illustrated in FIGS. 13A, 13B, and 13C is meant merely to be illustrative. A whole variety of such snap mechanisms are commonly used in microswitches as well as other switch designs.

Hysteresis can also be designed into the other implementations illustrated above. The amount of hysteresis which occurs in the design of FIG. 8, for example, can be controlled by the angular distance which beam 330 is permitted to rotate counter-clockwise before mass 320 interacts with housing 310. If the torque produced by hinge 362 is small, mass 320 will rest against housing 310 until the gravitational force vector passes through the pivot 362. Shortly thereafter, mass 320 will leave contact with housing 310 and rapidly move into a position where contact 352 engages contact 350. It will remain in this position until once again the gravitational force vector passes through pivot 362 when the switch is rotated in the counter-clockwise direction of FIG. 8.

For mechanical contact arrangements for most switches, it is desirable that the contacts wipe, that is, that the surface of one contact scrape across the surface of the other. In this manner, oxide films or other contaminants are penetrated. When the abrasive system illustrated in this invention is used, wiping is not necessary or even desirable. The minute microscopic abrasive particles which are incorporated in the contact surface successfully penetrate surface contamination to immediately achieve high quality contact.

Seismic masses having a cylindrical or rectangular cross-section and spherical rolling ball seismic masses have been illustrated here. Naturally other shapes could be used including rolling cylinders or portions of a spherical mass. A particular choice of mass shape would depend on the desires of the switch designer and on the particular application.

In the rolling ball device illustrated in FIG. 7, the housing was designed so that the ball would travel in a substantially straight line. If additional hysteresis is desired in the switch, a provision can be made to require the ball to roll over a bump, for example, prior to touching beam 230 and causing contacts 250 and 252 to engage. In this manner, the amount of hysteresis in the rolling ball system can be controlled.

In the device illustrated in FIG. 8, the beams are shown pointed upward. Naturally this switch could be inverted so that beams 370 and 372 emerge from the top of housing 310 instead of the bottom as shown in FIG. 8.

In the preferred implementation of the present invention, the seismic mass and contact beams are hermetically sealed in glass. In other applications, plastic may be utilized instead of glass and the sealing may be truly hermetic or in some cases the sensor may not be sealed at all.

In the examples illustrated herein, a hinge was formed in the contact beam by a stamping or metal forming operation. Naturally other techniques exist for creating pivots or hinges which would give the same or similar end result. Thus, although one particular type of hinge has been illustrated, the invention disclosed herein is not limited to this particular hinge design.

When the tilt switch of the present invention is tilted, an actuation force is created which is equal to the component of the total gravitational force on the seismic mass which is available to be used to create a contact engagement force. In the case of the rolling ball design of FIG. 7, the actuation force is equal to the mass of mass 220 times the acceleration of gravity times the cosine of the tilt angle. For a small tilt angle, the actuation force is nearly equal to the weight of the ball 220. In the case of the hinged system shown in FIGS. 1 through 2 the actuation force is equal to the mass of the seismic mass 110 times gravity times the sine of the tilt angle. The engagement force, as used herein, means the actual force between the two contacts. In this invention it has been shown that the engagement force can be much larger than the actuation force which permits the substantial reduction in the mass of the seismic mass and thus permits the miniaturization of the mechanical tilt switch.

Two methods of achieving a mechanical advantage wherein the engagement force exceeds the actuation force are disclosed above. In both cases, the engagement force is more than twice as large as the actuation force and in most cases a much greater amplification is achieved.

The term "acuation angle" as used herein means the angle at which the tilt switch must be rotated from a neutral position to where the switch closes.

In the example of FIGS. 4A and 4B, where a contact surface comprises abrasive particles in a conductive matrix, the conductive matrix is preferably gold, however, other metals such as copper, silver or platinum could be used in particular situations.

In examples illustrated here, the contacts have been supported by a contact beam which has been shown in the examples herein as a rectangular beam. Also, the hinge has been usually shown as a specific reduction in the beam thickness at a particular point along the beam. Naturally other beam geometries could be used and the hinge need not be at a specific location, but can be distributed along the entire length of the beam. In this case, the flexibility of the beam itself would be used in place of a specific hinged section. Therefore, although a specific rectangular beam with a localized hinge has been illustrated in most of the above examples, this invention is not limited thereby and beams of any shape and hinges of any type, including a continuously distributed hinge, are considered to be merely variations of the examples illustrated above.

For simplicity, the contact surfaces have been shown as flat planes in the above examples. In many implementations, it is desirable that the contact surfaces be curved so as to facilitate the engagement and disengagement of the contacts without creating excessive friction leads or wedging actions. In some cases, for example, the curvature of the contact would have an approximate radius of curvature equal to the length of the associated beams from the contact to the pivot point. In this case, the contacts would roll into engagement and roll out of engagement.

In the examples illustrated herein, in some cases the contact is a separate component which is attached to the contact beam whereas in other cases it is merely a particular part of the contact beam. For the purposes of this disclosure, in both of these cases the contact will be considered to be attached to the beams regardless of whether it is integral with the beam or a separate component.

The mathematical analysis of a embodiment of the tilt switch is presented in U.S. Pat. No. 5,457,293, included herein by reference, and will not be repeated here.

Tilt switches are used to turn on lights on vehicle hood and trunk lids when they are opened and are but one example of the use of the principles described above for automotive applications. Most automotive switches can be made more reliable, and thereby improving the overall reliability of the vehicle wiring system, through a redesign incorporating the use of a coating of diamond or other hard conductive particles onto the surface of one of the mating contacts as illustrated in FIG. 15 for a power window switch.

Figure 15:
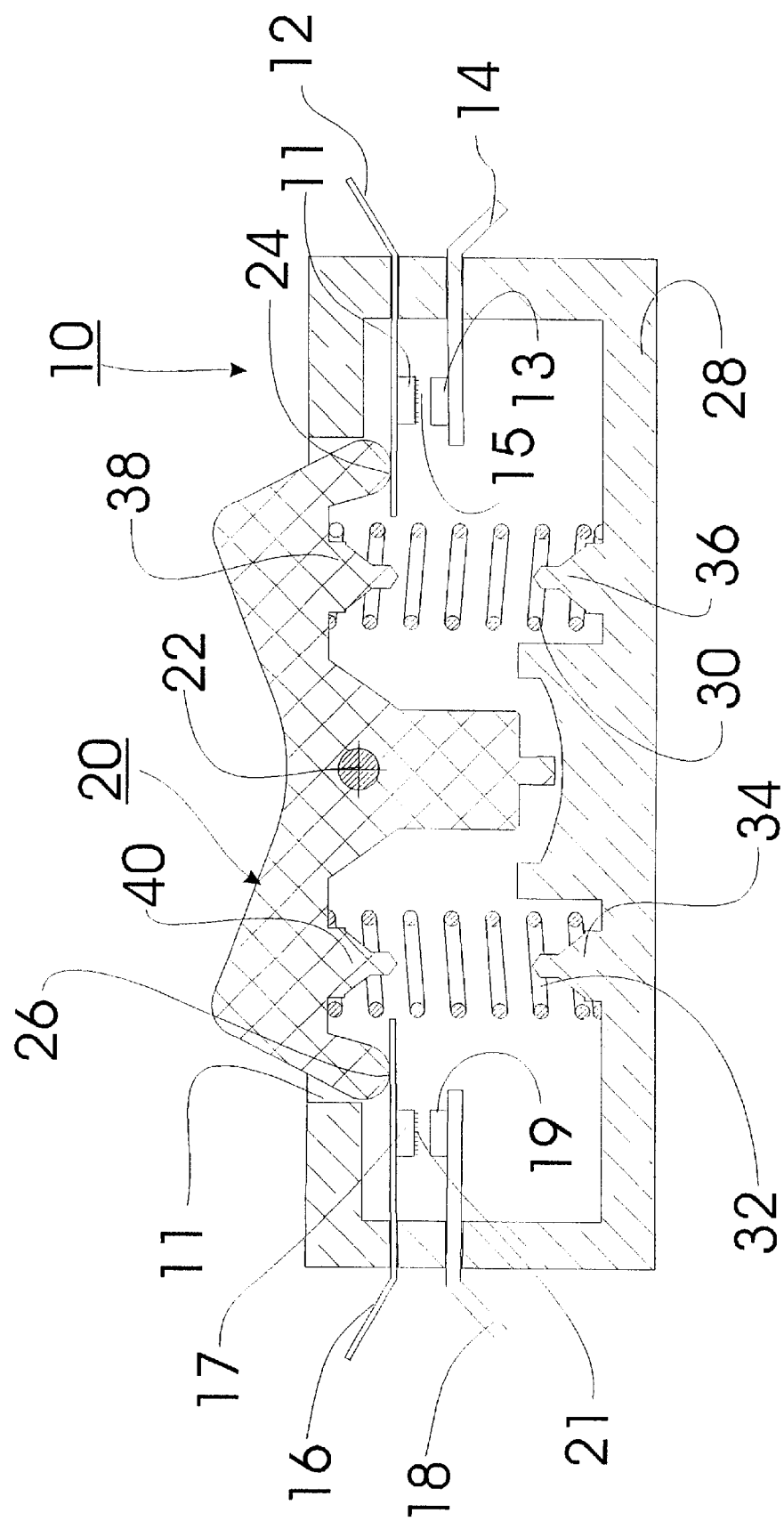
FIG. 15 is a cross sectional view of a window operation switch for a motor vehicle illustrating the teachings of this invention.

FIG. 15 is a cross sectional view of a window operation switch 10 for a motor vehicle illustrating the teachings of this invention. The switch comprises a housing 28 made of a material such as plastic or glass having an aperture 11 on one side thereof in which a tab 20 is pivotally mounted about a rotation axis 22. The pivotal mounting may be achieved by, e.g., cylindrical pins on the tab 20 which project into circular recesses on side walls of the housing 28. Four contacts 12,14,16,18 made of an electrically-conductive material lead into the interior of the housing 28 whereby when a circuit is completed through two contacts 12,14, the window is moved in one direction and when a circuit is completed through two contacts 16, 18, the window is moved in the opposite direction. The tab 20 has two leg portions 24,26 at opposed edges whereby leg portion 26 abuts an upper surface of contact 16 and leg portion 24 abuts an upper surface of contact 12. Springs 30,32 are mounted between an interior surface of the tab 20 and an interior surface of the housing 28 by means of suitable mounting fixtures 34,36,38,40 to provide resiliency to the tab 20 once it is no longer being depressed.

Thus, the tab forms a three position switch, the first position being the rest position in which the tab 20 is as shown in FIG. 15, i.e., the window is not opened or closed and not electrical circuits are completed. The second position is a window open position in which the tab 20 presses down on contact 12 causing it to engage contact 18 thereby completing an electrical circuit causing the window to open. The third position is a window closed position in which the tab 20 presses down on contact 16 causing it to engage contact 18 thereby completing an electrical circuit causing the window to close.

It should be understood that the window switch including two pair of opposed contacts is merely one type of switch in which the teachings of the invention may be applied. Indeed, the switch in accordance with the invention does not require two pair of opposed contacts such as shown in FIG. 15. Rather, a switch may be designed with only a single pair of contacts which contact one another upon the depression of a member of the switch, i.e., the member is movable between a first position in which the contacts are separated from one another and a second position in which engagement portions of the contacts engage one another. On the other hand, the switch may have more than two pair of switches or an odd number of contacts whereby a different pair of contacts engage one another upon different movements of the tab of the switch.

Most importantly, in accordance with this embodiment of the invention, the contact 12 has an outwardly projecting contact portion 11 which is adapted to engage and momentarily connect to an outwardly extending contact portion 13 on contact 14. To enhance the connection, and enable a connection with a lower force, particle interconnect is applied so that the contact portion 11 is coated with a layer of diamonds 15 or other hard abrasive particles (in a conductive matrix). Similarly, contact portion 17 on contact 16 is coated with a layer of diamonds 21 to enhance its connection to contact portion 19 on contact 18. It is also possible to provide a coating of the diamonds on both contact portions.

It is also possible to provide abrasive material directly on the contacts 12,14,16,18 and form the contacts so that there is contact via the abrasive material upon depressing the tab 20.

As shown in FIG. 15, contacts 12,14,16,18 extend through a middle portion of side walls of the housing 28 and are supported thereby. A portion of the opposed major surfaces of each contact 12,14,16,18 is thus exposed in the interior of the housing 28.

Figure 16:
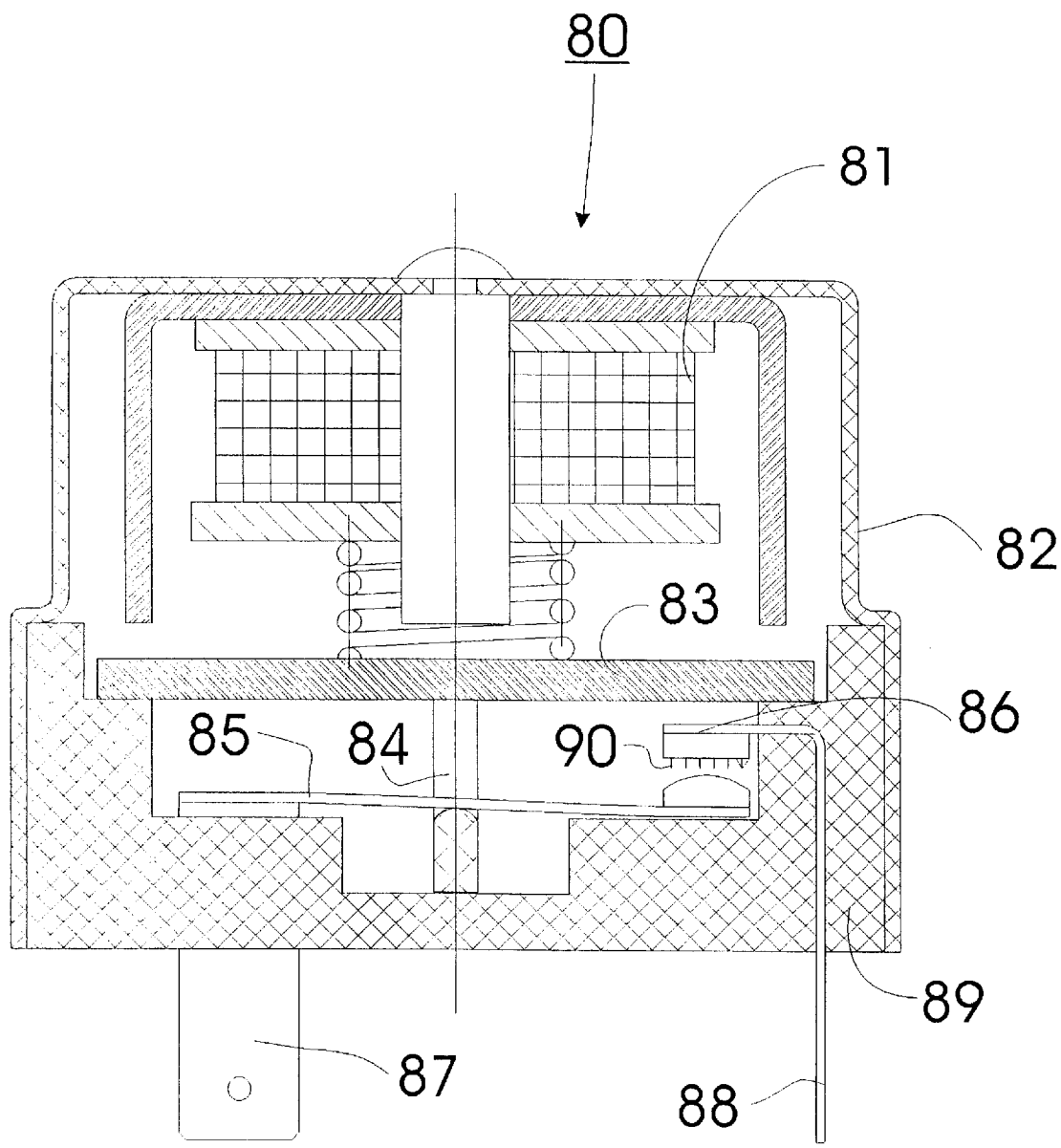
FIG. 16 is a cross sectional view of an automotive relay for a motor vehicle illustrating the teachings of this invention

Relays are also a source of electrical system failures in automobiles and trucks. The reliability of relays can be substantially improved if the contacts are made with the coating of hard particles as described above. FIG. 16 is a cross section view of an automotive relay 80 for a motor vehicle illustrating the teachings of this invention. The relay 80 comprises an electrical coil 81 which is energized through electrical wires, not shown. The parts of the relay 80 are held by a base 89 and a cover 82 which together make up the housing. When the coil 81 is energized, it attracts metal pole piece 83 which moves upward in the drawing, pulling bracket 84 with it. Contact 85 made of electrically-conductive material is attached to bracket 84 and hinged at its point of attachment to body 89. When contact 85 moves upward, it engages contact 86 completing the electric circuit thought leads 87 and 88. Contact 86 is coated with a layer of hard conductive particles 90 in the manner described above and in the referenced patents.

For those implementations, where the quantity of data to be transmitted over the bus warrants, a coax cable may be required. A connector for joining two coaxial cables 41 and 42 is illustrated in FIGS. 17a, 17b, 17c and 17d generally at 40. A cover 40a is hingably attached to a base 43. A connector plate 45 is slidably inserted into base 43 and contains two abrasion and connection sections 47 and 48. A second connecting plate 49 contains two connecting pins 46, one corresponding to each cable to be connected. To connect the two cables 41 and 42 together, they are first inserted into their respective holes 50 and 51 in base 43 until they are engaged by pins 46. Sliding connector plate 45 is then inserted and cover 44 rotated pushing connector plate 45 downward until the catch 52 snaps over mating catch 53. Other latching means are of course usable in accordance with the invention. During this process, the serrated part 47 of connector plate 45 abrades the insulating cover off of the outside of the respective cable exposing the outer conductor. The particle coated section 48 of connector plate 45 then engages and makes electrical contact with the outer conductor of the coaxial cables 41 and 42. In this manner, the two coaxial cables 41,42 are electrically connected together in a very simple manner.

Figure 18:
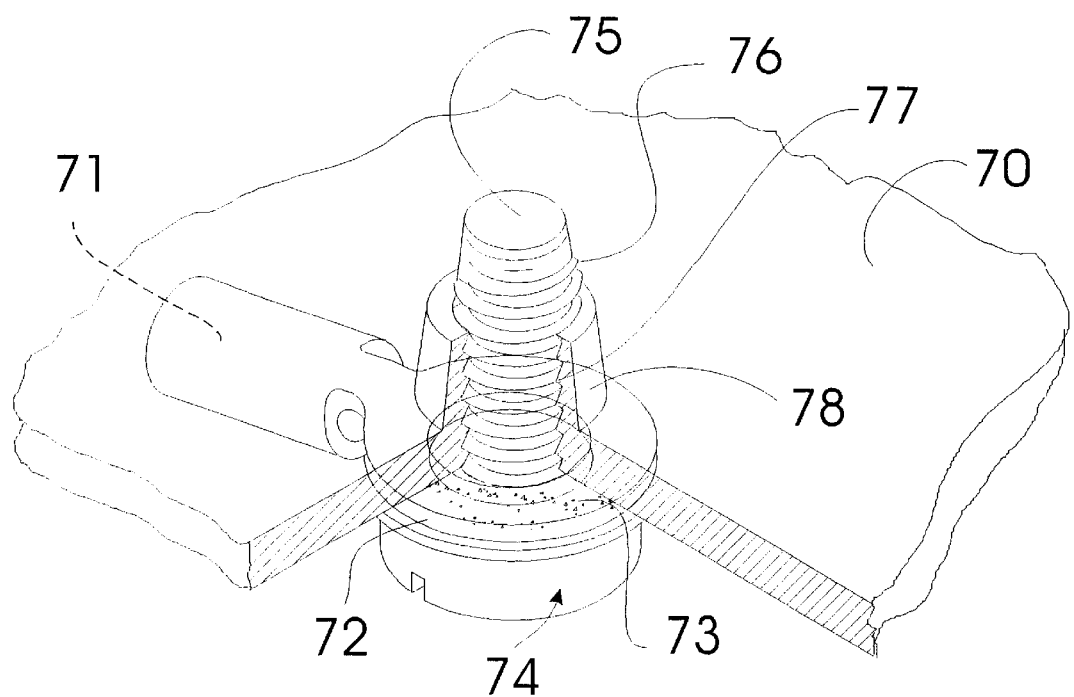
FIG. 18 is a perspective view of an electrical connection to a sheet metal member of a motor vehicle illustrating the teachings of this invention.

FIG. 18 is a perspective view of an electrical connection to a sheet metal member of a motor vehicle illustrating the teachings of this invention with portions cut away. Specifically, the sheet metal member 70 is provided with a fitting aperture 78 on one side thereof which has a interior surface with threads 77. A connecting member 71, electrical connection between member 71 and sheet metal member 70 being desired, is provided with a flattened ring-shaped end portion 72 which has an aperture fitted around a mounting member 74, such as a screw. Mounting member 74 has a projecting portion 75 with threads 76 on an outer surface cooperating with the threads 77 on the interior surface of the fitting aperture 78. Most importantly, the upper surface of the ring-shaped end portion 72 of the connecting member 71 which will directly engage and contact a lower surface of the metal sheet member 70 is provided with a layer of diamonds 73 or other hard conductive particles. Further, upon rotation of the mounting member/screw 74, the ring-shaped end portion 72 will be pressed into the sheet metal member 70.

Figure 19:
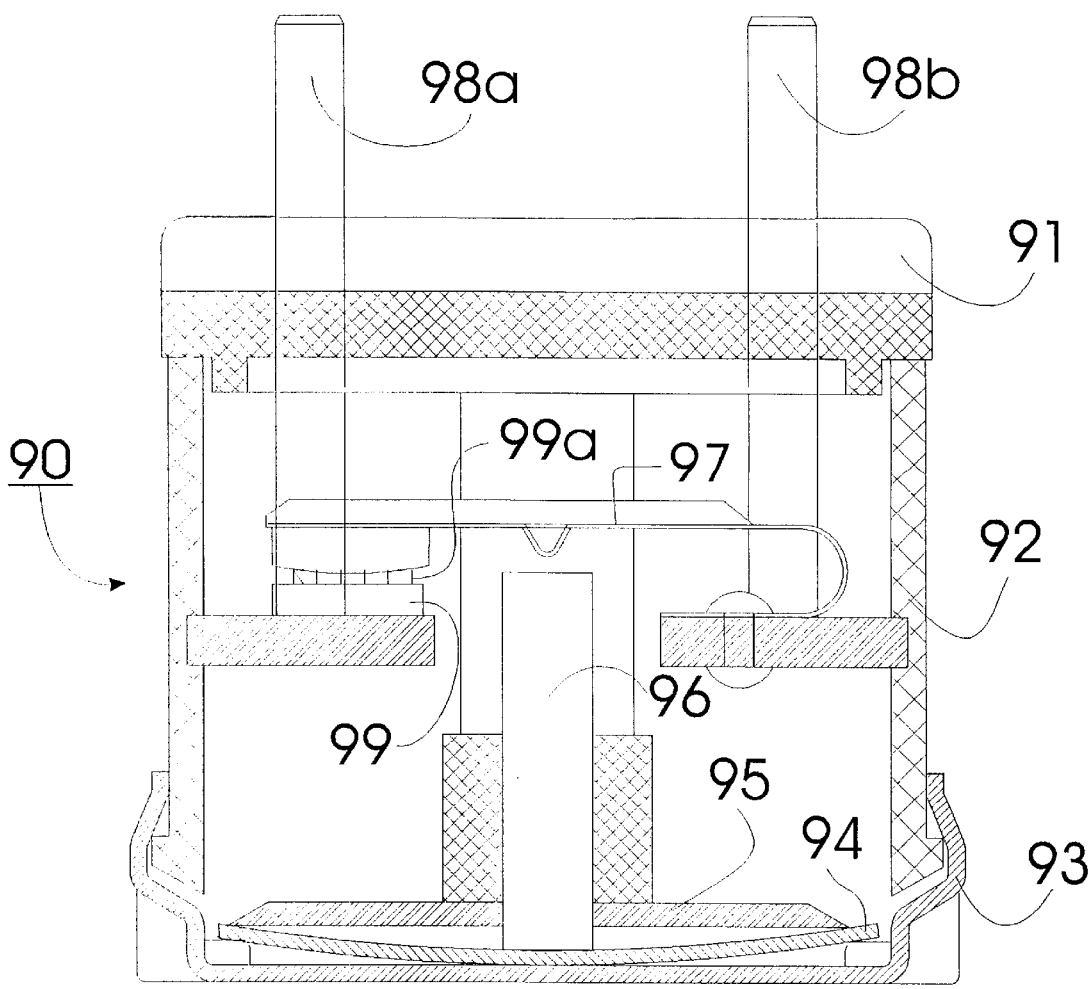
FIG. 19 is a cross sectional view of a thermal cutoff switch illustrating the teachings of this invention.

FIG. 19 is a cross sectional view of a thermal cutoff switch illustrating the teachings of this invention. This device operates in a similar manner as the relay of FIG. 16 only the switch is initially in the closed position and the motive force is a bimetallic disc instead of an electro magnet. The device is illustrated generally as 90 in FIG. 19 and comprises a base 91, a housing 92 and a cover 93 which together house the remaining parts of the device. A bimetallic disc 94 rests against cover 93 and support 95. Push rod 96 is connected to disc 94. When the temperature of the disc 94 rises, it begins to flatten due to the difference in thermal expansion coefficients of the two layers of the disc in a manner well known to those skilled in the art. Upon a sufficient rise in temperature, disc 94 flattens sufficiently as to displace push rod 96 to where it contacts contact 97 causing it to disengage from contact 99 thereby opening the circuit between pins 98*a* and 98*b*. Once again, the surface of the contacts 97 and 99 is coated with abrasive particles in a conductive matrix as discussed above (coating layer 99*a*). This coating substantially increases the life of the contacts and thereby significantly increases the reliability of this thermal cutoff switch.

For the foregoing description, the following terms as defined as follows:

The term "component" refers to any part or assembly of parts which is mounted to or a part of a motor vehicle and which is capable of emitting a signal representative of its operating state. The following is a partial list of general automobile and truck components, the list not being exhaustive:

engine;
transmission;
brakes and associated brake assembly;
tires;
wheel;
steering wheel and steering column assembly;
water pump;
alternator;
shock absorber;
wheel mounting assembly;
radiator;
battery;
oil pump;
fuel pump;
air conditioner compressor;
differential gear;
exhaust system;
fan belts;
engine valves;
steering assembly;
vehicle wiring system; and
engine cooling fan assembly.

The term "sensor" refers to any measuring or sensing device mounted on a vehicle or any of its components including new sensors mounted in conjunction with the diagnostic module in accordance with the invention. A partial, non-exhaustive list of common sensors mounted on an automobile or truck is:

airbag crash sensor;
accelerometer;
microphone;
coolant thermometer;
oil pressure sensor;
oil level senor;
air flow meter;
voltmeter;
ammeter;
humidity sensor;
engine knock sensor;
oil turbidity sensor;
throttle position sensor;
steering wheel torque sensor;
wheel speed sensor;
tachometer;
speedometer;
oxygen sensor;
pitch and roll sensors;
clock;
odometer;
power steering pressure sensor;
pollution sensor;
fuel gauge;
cabin thermometer;
transmission fluid level sensor;
yaw sensor;
coolant level sensor;
transmission fluid turbidity sensor;
brake pressure sensor;
coolant pressure sensor;
occupant position sensor; and
occupant weight sensor.

The term "actuator" herein refers to a device that performs some action upon receiving the proper signal. Examples of actuators include:

window motor;
door opening and closing motor;
electric door lock;
deck lid lock;
airbag inflator initiator;
fuel injector;
brake valves;
pumps;
relays; and
steering assist devices.

The term "signal" herein refers to any time varying output from a component including electrical, acoustic, thermal, or electromagnetic radiation, or mechanical vibration.

Sensors on a vehicle are generally designed to measure particular parameters of particular vehicle components. However, frequently these sensors also measure outputs from other vehicle components. For example, electronic airbag crash sensors currently in use contain an accelerometer for determining the accelerations of the vehicle structure so that the associated electronic circuitry of the airbag crash sensor can determine whether a vehicle is experiencing a crash of sufficient magnitude so as to require deployment of the airbag. This accelerometer continuously monitors the vibrations in the vehicle structure regardless of the source of these vibrations. If a wheen is out of balance, or if there is extensive wear of the parts of the front wheel mounting assembly, or wear in the shock absorbers, the resulting abnormal vibrations or accelerations can, in many cases, be sensed by the crash sensor accelerometer. There are other cases, however, where the sensitivity or location of the airbag crash sensor accelerometer is not appropriate and one or more additional accelerometers may be mounted onto a vehicle for the purposes of this invention.

Every component of a vehicle emits various signals during its life. These signals can take the form of electromagnetic radiation, acoustic radiation, thermal radiation, vibrations transmitted through the vehicle structure, and voltage or current fluctuations, depending on the particular component. When a component is functioning normally, it may not emit a perceptible signal. In that case, the normal signal is no signal, i.e., the absence of a signal. In most cases, a component will emit signals that change over its life and it is these changes which contain information as to the state of the component, e.g., whether failure of the component is impending. Usually components do not fail without warning. However, most such warnings are either not perceived or if perceived are not understood by the vehicle operator until the component actually fails and, in some cases, a breakdown of the vehicle occurs. In a few years, it is expected that various roadways will have systems for automatically guiding vehicles operating at high speed thereon. Such systems have been called "smart Highways" and are part of the field of intelligent transportation systems (ITS). If a vehicle operating on such a smart highway were to breakdown, serious disruption of the system could result and the safety of other users of the smart highway could be endangered.

In accordance with the invention, each of these signals emitted by the vehicle components is converted into electrical signals and then digitized (i.e., the analog signal is converted into a digital signal) to create numerical time series data which is then entered into a processor. Pattern recognition algorithms then are applied in the processor to attempt to identify and classify patterns in this time series data. For a particular component, such as a tire for example, the algorithm attempts to determine from the relevant digital data whether the tire is functioning properly or whether it requires balancing, additional air, or perhaps replacement.

Frequently, the data entered into the computer needs to be preprocessed before being analyzed by a pattern recognition algorithm. The data from a wheel speed sensor, for example, might be used as is for determining whether a particular tire is operating abnormally in the event it is unbalanced, whereas the integral of the wheel speed data over a long time period (a preprocessing step), when compared to such sensors on different wheels, might be more useful in determining whether a particular tire is going flat and therefore needs air. In some cases, the frequencies present in a set of data is a better predictor of component failures than the data itself. For example, when a motor begins to fail due to worn bearings, certain characteristic frequencies began to appear. Moreover, the identification of which component is causing vibrations present in the vehicle structure can frequently be accomplished through a frequency analysis of the data. For these cases, a Fourier transformation of the data is made prior to entry of the data into a pattern recognition algorithm. Other mathematical transformations are also made for particular pattern recognition purposes in practicing the teachings of this invention. Some of these include shifting and combining data to determine phase changes, differentiating the data, filtering the data, and sampling the data. Also, there exist certain more sophisticated mathematical operations that attempt to extract or highlight specific features of the data. This invention contemplates the use of a variety of these preprocessing techniques and the choice of which ones is left to the skill of the practitioner designing a particular diagnostic module.

When a vehicle component begins to change its operating behavior, it is not always apparent from the particular sensors, if any, which are monitoring that component. The output from any one of these sensors can be normal even though the component is failing. By analyzing the output of a variety of sensors, however, the pending failure can be diagnosed. For example, the rate of temperature rise in the vehicle coolant, it it were monitored, might appear normal unless it were known that the vehicle was idling and not traveling down a highway at a high speed. Even the level of coolant temperature which is in the normal range could be in fact abnormal in some situations signifying a failing coolant pump, for example, but not detectable from the coolant thermometer alone.

The pending failure of some components is difficult to diagnose and sometimes the design of the component requires modification so that the diagnosis can be more readily made. A fan belt, for example, frequently begins failing by a cracking of the inner surface. The belt can be designed to provide a sonic or electrical signal when this cracking begins in a variety of ways. Similarly, coolant hoses can be designed with an intentional weak spot where failure will occur first in a controlled manner that can also cause a whistle sound as a small amount of steam exits from the hose. This whistle sound that then be sensed by a general purpose microphone, for example.

Figure 20:
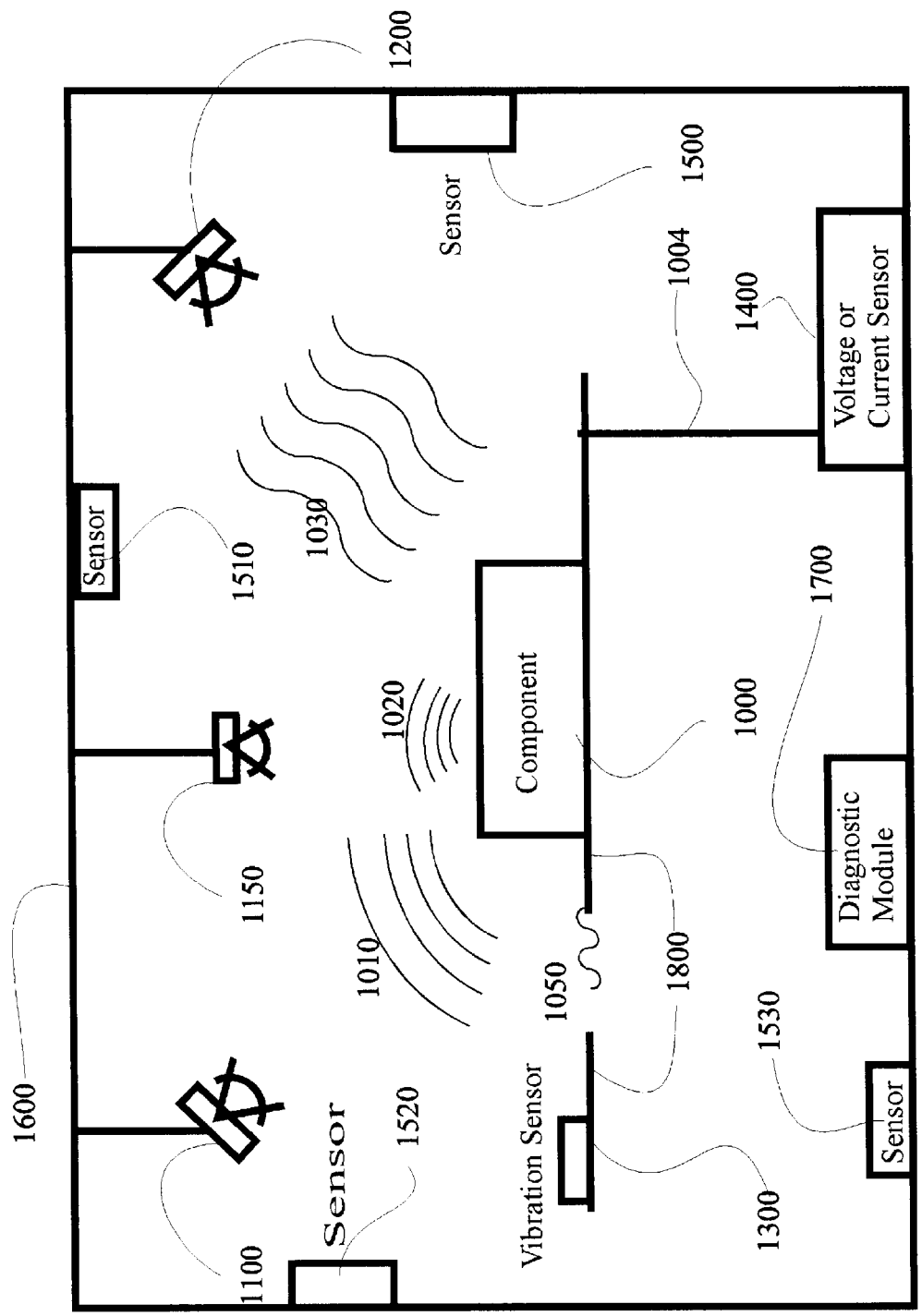
FIG. 20 is a schematic illustration of a generalized component with several signals being emitted and transmitted along a variety of paths, sensed by a variety of sensors and analyzed by the diagnostic module in accordance with the invention and for use in a method in accordance with the invention.

In FIG. 20, a generalized component 1000 emitting several signals which are transmitted along a variety of paths, sensed by a variety of sensors and analyzed by the diagnostic device in accordance with the invention is illustrated schematically. Component 1000 is mounted to a vehicle 1800 and during operation it emits a variety of signals such as acoustic 1010, electromagnetic radiation 1020, thermal radiation 1030, current and voltage fluctuations in conductor 1040 and mechanical vibrations 1050. Various sensors are mounted in the vehicle to detect the signals emitted by the component 1000. These include a vibration sensor (accelerometer) 1300 also mounted to the vehicle, acoustic sensor 1100, electromagnetic radiation sensor 1150, heat radiation sensor 1200, and voltage or current sensor 1400. In addition, various other sensors 1500, 1510, 1520, 1530 measure other parameters of other components that in some manner provide information directly or indirectly on the operation of component 1000. All of the sensors illustrated on FIG. 20 are connected to a data bus 1600. A diagnostic module 1700, in accordance with the invention, is also attached to the vehicle data bus 1600 and receives the signals generated by the various sensors.

As shown in FIG. 20, the diagnostic module 1700 has access to the output data of each of the sensors that have information relative to the component 1000. This data appears as a series of numerical values each corresponding to a measure value at a specific point in time. The cumulative data from a particular sensor is called a time series of individual data points. The diagnostic module 1700 compares the patterns of data received from each sensor individually, or in combination with data from other sensors, with patterns for which the diagnostic module has been trained to determine whether the component is functioning normally or abnormally.

Central to the diagnostic teachings of this invention is the manner in which the diagnostic module 1700 determines a normal pattern from an abnormal pattern and the manner in which it decides what data to use from the vast amount of data available. This is accomplished using pattern recognition technologies, such as artificial neural networks, and training. The theory of neural networks including many examples can be found in several books on the subject including : *Techniques and Application Of Neural Networks*, edited by Taylor, M. and Lisboa, P., Ellis Horwood, West Sussex, England, 1993; *Naturally Intelligent Systems*, by Caudill, M. and Butler, C., MIT Press, Cambridge Mass., 1990; J. M. Zaruda, *Introduction to Artificial Neural*

*Systems*, West publishing Co., N.Y., 1992 and, *Digital Neural Networks*, by Kung, S. Y., PTR Prentice Hall, Englewood Cliffs, N.J., 1993, Eberhart, R., Simpson, P. and Dobbins, R., *Computational Intelligence PC Tools*, Acadmeic Press, Inc., 1996, Orlando, Fla., all of which are included herein reference. The neural network pattern recognition technology is one of the most developed of pattern recognition technologies. Newer and more efficient systems are now being developed such as the neural network system which is being developed by Motorola and is described in U.S. Pat. No. 5,390,136 and U.S. patent application Ser. No. 08/76,602. The neural network will be used here to illustrate one example of a pattern recognition technology but it is emphasized that this invention is not limited to neural networks. Rather, the invention may apply any known pattern recognition technology. A brief description of the neural network pattern recognition technology is set forth below.

Neural networks are constructed of processing elements known as neurons that are interconnected using information channels cell interconnects. Each neuron can have multiple inputs but only one output. Each output however is connected to all other neurons in the next layer. The neurons in the first layer operate collectively on the input data as described in more detail below. Neural networks learn by extracting relational information from the data and the desired output. Neural networks have been applied to a wide variety of pattern recognition problems including automobile occupant sensing, speech recognition, optical character recognition, and handwriting analysis.

To train a neural network, data is provided in the form of one or more time series that represents the condition to be diagnosed as well as normal operation. As an example, the simple case of an out of balance tire will be used. Various sensors on the vehicle are used to extract information from signals emitted by the tire such as the airbag accelerometer, a torque sensor on the steering wheel or the pressure output of the power steering system. Other sensors that might not have an obvious relations to tire unbalance are also included such as, for example, the vehicle speed or wheel speed. Data is taken from a variety of vehicles where the tires were accurately balanced under a variety of operating conditions also for cases where varying amounts of unbalance was intentionally introduced. Once the data has been collected, some degree of preprocessing is usually performed to reduce the total amount of data fed to the neural network. In the case of the unbalanced tire, the time period between data points might be chosen such that there are at least ten data points per revolution of the wheel. For some other application, the time period might be one minute or one millisecond.

Once the data has been collected, it is processed by a neural network generating program, for example, if a neural network pattern recognition system is to be used. Such programs are available commercially, e.g., from NeuralWare of Pittsburgh, Pa. The program proceeds in a trial and error manner until it successfully associates the various patterns representative of abnormal behavior, an unbalanced tire, with that condition. The resulting neural network can be tested to determine if some of the input data from some of the sensors, for example, can be eliminated. In this way, the engineer can determine what sensor data is relevant to a particular diagnostic problem. The program then generates an algorithm that is programmed onto a microprocessor, microcontroller, neural processor, or DSP (herein collectively referred to as a microprocessor or processor). Such a microprocessor appears inside the diagnostic module 1700 in FIG. 20. Once trained, the neural network, as represented by the algorithm, will now recognize an unbalanced tire on a vehicle when this event occurs. At this time, when the tire is unbalanced, the diagnostic module 1700 will output a message to the driver indicating that the tire should be now be balanced as described in more detail below. The message to the driver is provided by output means coupled to or incorporated within the module 1700 and may be, e.g., a light on the dashboard, a vocal tone or any other recognizable indication apparatus. Messages can also be transmitter to others outside of the vehicle such as other vehicles or to a vehicle dealer. In some cases, control of the vehicle may be taken over by a vehicle system in response to a message.

Discussions on the operation of a neural network can be found in the above references on the subject and are well understood by those skilled in the art. Neural networks are the most well known of the pattern recognition technologies based on training, although neural network have only recently received widespread attention and have been applied to only very limited and specialized problems in motor vehicles. Other non-training based pattern recognition technologies exist, such as fuzzy logic. However, the programming required to use fuzzy logic, where the patterns must be determine by the programmer, render these systems impractical for general vehicle diagnostic problems such as described herein. Therefore, preferably the pattern recognition systems that learn by training are used herein. On the other hand, the combination of neural networks and fuzzy logic, such as in a Neural-Fuzzy system, are applicable and can result in superior results.

The neural network is the first highly successful of what will be a variety of pattern recognition techniques based on training. There is nothing that suggests that it is the only or even the best technology. The characteristics of all of these technologies which render them applicable to this general diagnostic problem include the use of time-based input data and that they are trainable. In all cases, the pattern recognition technology learns from examples of data characteristic of normal and abnormal component operation.

Figure 21:
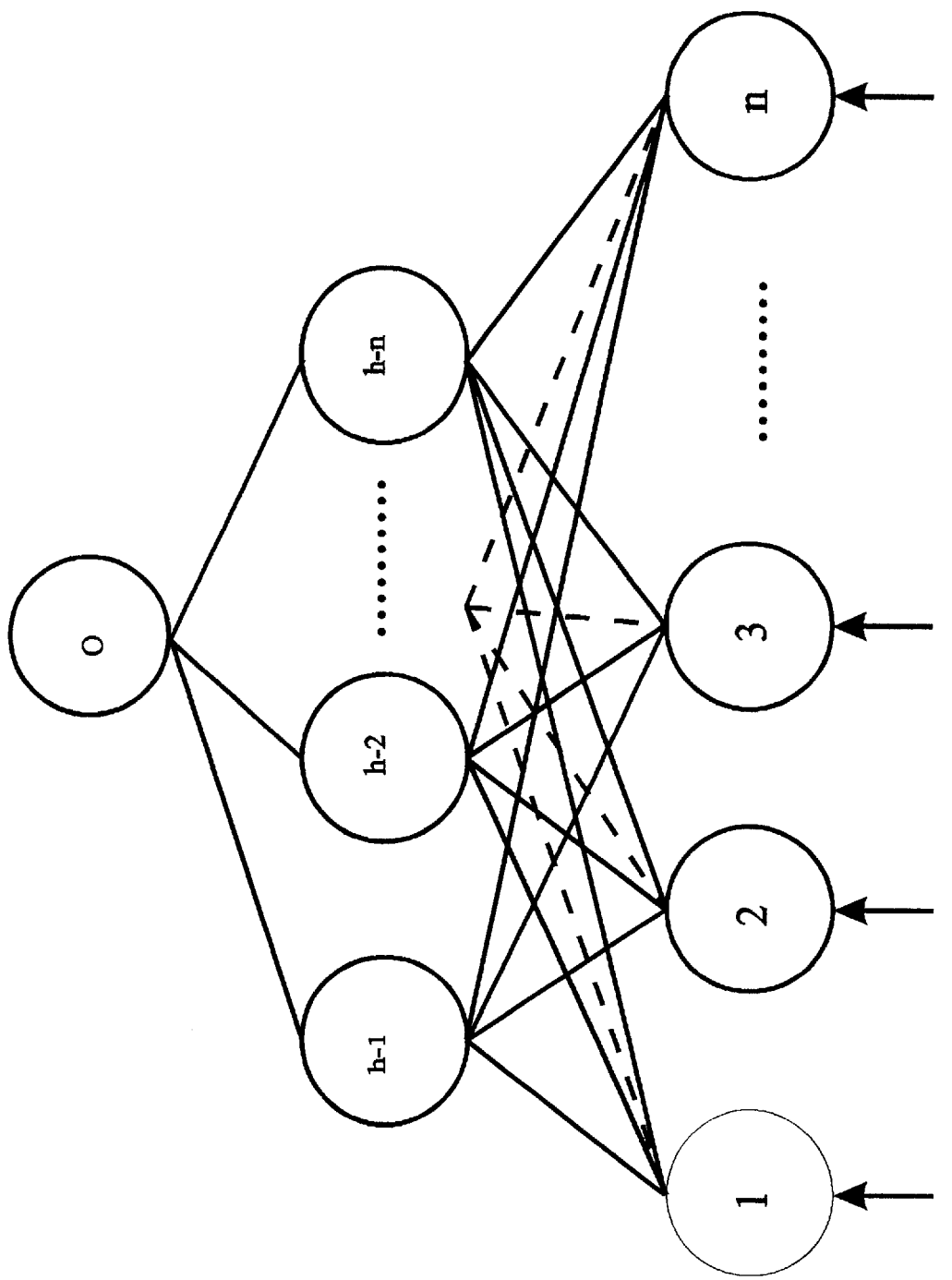
FIG. 21 is a schematic of one pattern recognition methodology known as a neural network which may be used in a method in accordance with the invention.

A diagram of one example of a neural network used for diagnosing an unbalanced tire, for example, based on the teachings of this invention is shown in FIG. 21. The process can be programmed to periodically test for an unbalanced tire. Since this need be done only infrequently, the same processor can be used for many such diagnostic problems. When the particular diagnostic test is run, data from the previously determined relevant sensors is preprocessed and analyzed with the neural network algorithm. For the unbalanced tire, using the data from an accelerometer, the digital acceleration values from the analog to digital converter in the accelerometer are entered into nodes 1 through n and the neural network algorithm compares the pattern of values on nodes 1 through n with patterns for which it has been trained as follows.

Each of the input nodes is connected to each of the second layer nodes, h-1,h-2, . . . , h-n, called the hidden layer, either electrically as in the case of a neural computer, or through mathematical functions containing multiplying coefficients called weights, in the manner described in more detail in the above references. At each hidden layer node, a summation occurs of the values from each of the input layer nodes, which have been operated on by functions containing the weights, to create a node value. Similarly, the hidden layer nodes are in like manner connected to the output layer node(s), which in this example is only a single node O representing the decision to notify the driver of the unbalanced tire. During the training phase, an output node value of 1, for example, is assigned to indicate that the driver should be notified and a value of 0 is assigned to not doing so. Once again, the details of this process are described in above-referenced texts and will be not presented in detail here.

In the example above, twenty input nodes were used, five hidden layer nodes and one output layer node. In this example, only one sensor was considered and accelerations from only one direction were used. If other data from other sensors such as accelerations from the vertical or lateral directions were also used, then the number of input layer nodes would increase. Again, the theory for determining the complexity of a neural network for a particular application has been the subject of many technical papers and will not be presented in detail here. Determining the requisite complexity for the example presented here can be accomplished by those skilled in the art of neural network design.

Briefly, the neural network described above defines a method, using a pattern recognition system, of sensing an unbalanced tire and determining whether to notify the driver and comprises the steps of:

(a) obtaining an acceleration signal from an accelerometer mounted on a vehicle;

(b) converting the acceleration signal into a digital time series;

(c) entering the digital time series data into the input nodes of the neural network;

(d) performing a mathematical operation on the data from each of the input nodes and inputting the operated on data into a second series of nodes wherein the operation performed on each of the input node data prior to inputting the operated on value to a second series node is different from (e.g., may emply a different weight) that operation performed on some other input node data;

(e) combining the operated on data from all of the input nodes into each second series node to form a value at each second series node;

(f) performing a mathematical operation on each of the values on the second series of nodes and inputting this operated on data into an output series of nodes wherein the operation performed on each of the second series node data prior to inputting the operated on value to an output series node is in general different from (e.g., may employ a different weight) that operation performed on some other second series node data;

(g) combining the operated on data from all of the second series nodes into each output series node to form a value at each output series node; and, (h) notifying a driver or taking or causing some other action if the value on one output series node is within a chosen ranged signifying that a tire requires balancing.

This method can be generalized to a method of predicting that a component of a vehicle will fail comprising the steps of:

(a) sensing a signal emitted from the component;

(b) converting the sensed signal into a digital time series;

(c) entering the digital time series data into a pattern recognition algorithm;

(d) executing the pattern recognition algorithm to determine if there exists within the digital time series data a pattern characteristic of abnormal operation of the component; and (e) notifying a driver or taking or causing some other action if the abnormal pattern is recognized.

The particular neural network described and illustrated above contains a single series of hidden layer nodes. In some network designs, more than one hidden layer is used, although only rarely will more than two such layers appear. There are of course many other variations of the neural network architecture illustrated above which appear in the referenced literature. For the purposes herein, therefore, "neural network" will be defined as a system wherein the data to be processed is separated into discrete values which are then operated on and combined in at least a two stage process and where the operation performed on the data at each stage is in general different for each discrete value and where the operation performed is at least determined through a training process.

The implementation of neural networks can take on at least two forms, an algorithm programmed on a digital microprocessor or in a neural computer. In this regard, it is noted that neural computer chips are now becoming available.

In the example above, only a single component failure was discussed using only a single sensor since the data from the single sensor contains a pattern which the neural network was trained to recognize as either normal operation of the component or abnormal operation of the component. The diagnostic module 1700 contains preprocessing and neural network algorithms for a number of component failures. The neural network algorithms are generally relatively simple, requiring only a few dozen or a few hundred lines of computer code. A single general neural network program can be used for multiple pattern recogniztion cases by specifying different coefficients for the various terms, one set for each application. Thus, adding different diagnostic checks has only a small affect on the cost of the system. Also, the system has available to it all of the information available on the data bus. During the training process, the pattern recognition program sorts out from the available vehicle data on the data bus, those patterns that predict failure of a particular component.

Figure 22:
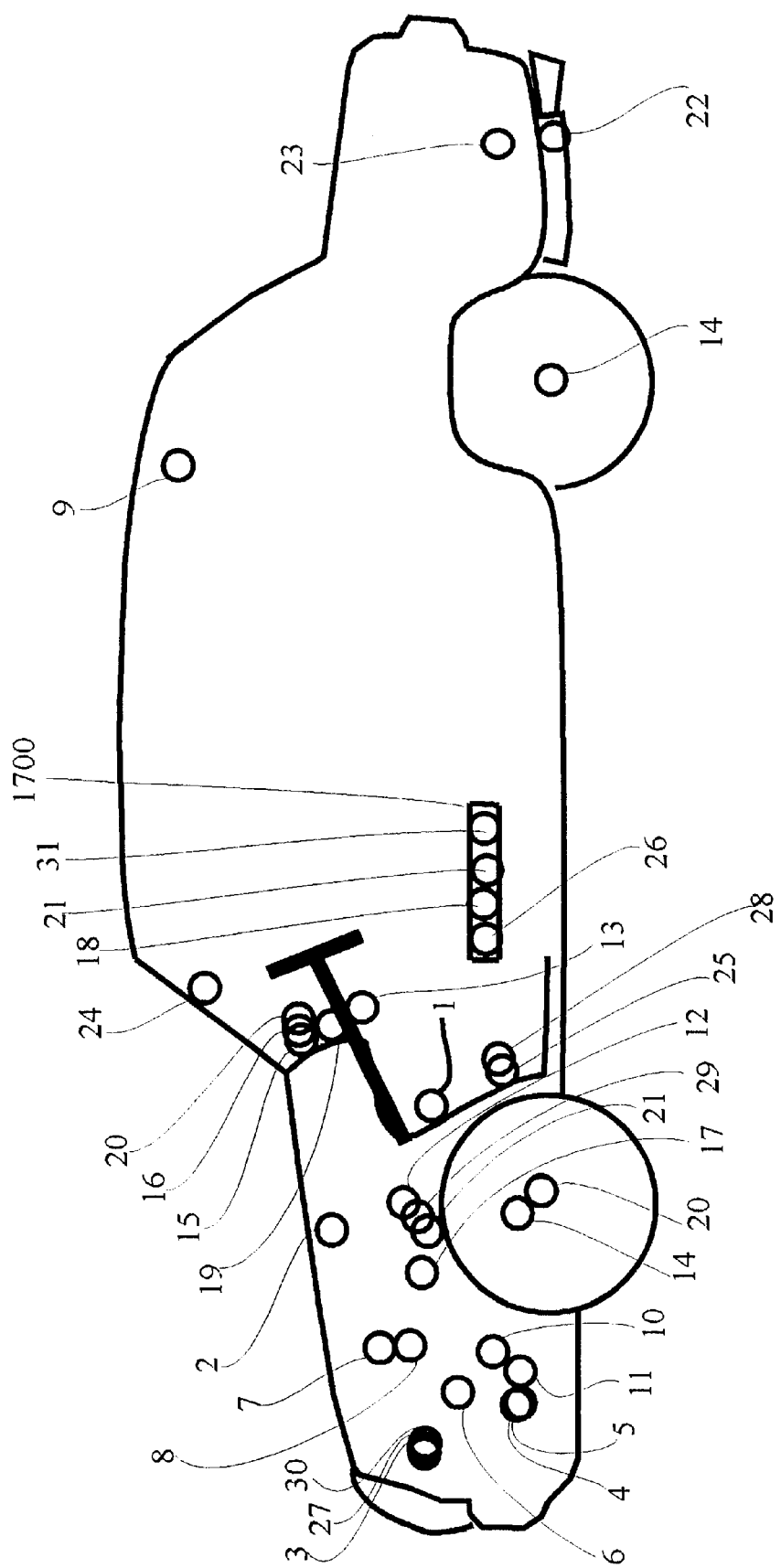
FIG. 22 is a schematic of a vehicle with several components and several sensors and a total vehicle diagnostic system in accordance with the invention utilizing a diagnostic module in accordance with the invention and which may be used in a method in accordance with the invention.
Figure 23:
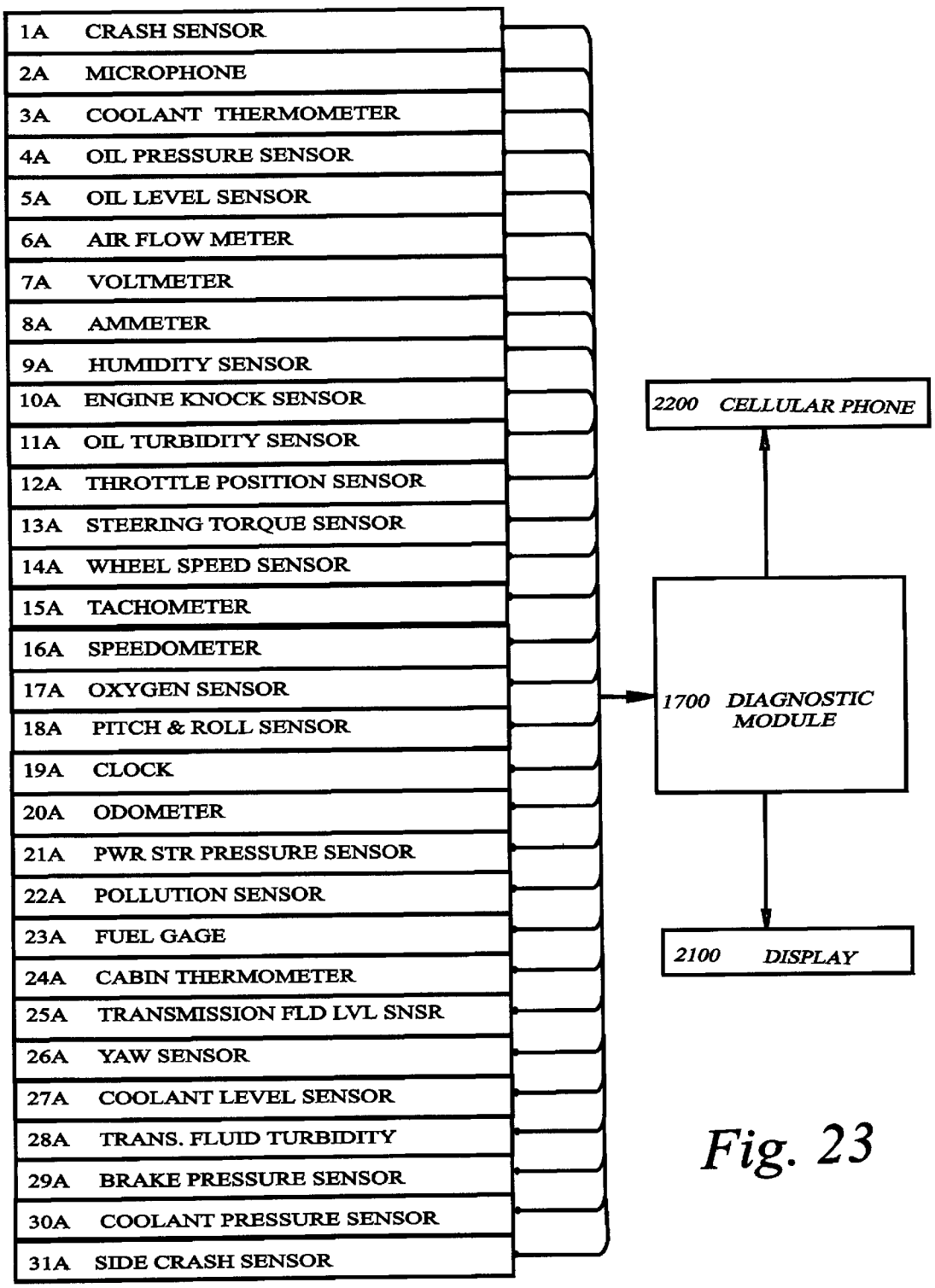
FIG. 23 is a flow diagram of information flowing from various sensors onto the vehicle data bus and thereby into the diagnostic module in accordance with the invention with outputs to a display for notifying the driver, and to the vehicle cellular phone for notifying another person, of a potential component failure.

In FIG. 22, a schematic of a vehicle with several components and several sensors is shown in their approximate locations on a vehicle along with a total vehicle diagnostic system in accordance with the invention utilizing a diagnostic module in accordance with the invention. A flow diagram of information passing from the various sensors shown on FIG. 22 onto the vehicle data bus and thereby into the diagnostic device in accordance with the invention is shown in FIG. 23 along with outputs to a display for notifying the driver and to the vehicle cellular phone for notifying the dealer, vehicle manufacturer or other entity concerned with the failure of a component in the vehicle. If the vehicle is operating on a smart highway, for example, the pending component failure information may also be communicated to a highway control system and/or to other vehicles in the vicinity so that an orderly exiting of the vehicle from the smart highway can be facilitated. FIG. 23 also contains the names of the sensors shown numbered on FIG. 22.

Sensor 1A is a crash sensor having an accelerometer (alternately a dedicated accelerometer can be used), sensor 2A is a microphone, sensor 3A is a coolant thermometer, sensor 4A is an oil pressure sensor, sensor 5A is an oil level sensor, sensor 6A is an air flow meter, sensor 7A is a voltmeter, sensor 8A is an ammeter, sensor 9A is a humidity sensor, sensor 10A is an engine knock sensor, sensor 11A is an oil turbidity sensor, sensor 12A is a throttle position sensor, sensor 13A is a steering torque sensor, sensor 14A is a wheel speed sensor, sensor 15A is a tachometer, sensor 16A is a speedometer, sensor 17A is an oxygen sensor, sensor 18A is a pitch/roll sensor (such as using an angular rate sensor from the Systron Donner Company), sensor 19A is a clock, sensor 20A is an odometer, sensor 21A is a power steering pressure sensor, sensor 22A is a pollution sensor, sensor 23A is a fuel gauge, sensor 24A is a cabin thermometer, sensor 25A is a transmission fluid level sensor, sensor 26A is a yaw sensor, sensor 27A is a coolant level sensor, sensor 28A is a transmission fluid turbidity sensor, sensor 29A is brake pressure sensor and sensor 30A is a coolant pressure sensor. Other possible sensors include a temperature transducer, a pressure transducer, a liquid level sensor, a flow meter, a position sensor, a velocity sensor, a RPM sensor, a chemical sensor and an angle sensor.

Consider now some examples. The following is a partial list of potential component failures and the sensors from the list on FIG. 23 that might provide information to predict the failure of the component.

| | |
|---|---|
| Out of balance tires | 1A, 13A, 14A, 15A, 20A, 21A |
| Front end out of alignment | 1A, 13A, 21A, 26A |
| Tune up required | 1A, 3A, 10A, 12A, 15A, 17A, 20A, 22A |
| Oil change needed | 3A, 4A, 5A, 11A |
| Motor failure | 1A, 2A, 3A, 4A, 5A, 6A, 10A, 12A, 15A, 17A, 22A |
| Low tire pressure | 1A, 13A, 14A, 15A, 20A, 21A |
| Front end looseness | 1A, 13A, 16A, 21A, 26A |
| Cooling system failure | 3A, 15A, 24, 27A, 30A |
| Alternator problems | 1A, 2A, 7A, 8A, 15A, 19A, 20A |
| Transmission problems | 1A, 3A, 12A, 15A, 16A, 20A, 25A, 28A |
| Differential problems | 1A, 12A, 14A |
| Brakes | 1A, 2A, 14A, 18A, 20A, 26A, 29A |
| Catalytic converter and muffler | 1A, 2A, 12A, 15A, 22A |
| Ignition | 1A, 2A, 7A, 8A, 9A, 10A, 12A, 17A, 23A |
| Tire wear | 1A, 13A, 14A, 15A, 18A, 20A, 21A, 26A |
| Fuel leakage | 20A, 23A |
| Fan belt slippage | 1A, 2A, 3A, 7A, 8A, 12A, 15A, 19A, 20A |
| Alternator deterioration | 1A, 2A, 7A, 8A, 15A, 19A |
| Coolant pump failure | 1A, 2A, 3A, 24A, 27A, 30A |
| Coolant hose failure | 1A, 2A, 3A, 27A, 30A |
| Starter failure | 1A, 2A, 7A, 8A, 9A, 12A, 15A |
| Dirty air filter | 2A, 3A, 6A, 11A, 12A, 17A, 22A |

Several interesting facts can be deduced from review of the above list. First, all of the failure modes listed can be at least partially sensed by multiple sensors. In many cases, some of the sensors merely add information to aid in the interpretation of signals received from other sensors. In today's automobile, there are few if any cases where multiple sensors are used to diagnose or predict a problem. In fact, there is virtually no failure prediction undertaken at all. Second, many of the failure modes listed require information from more than one sensor. Third, information for many of the failure modes listed can not be obtained by observing one data point in time as is now done by most vehicle sensors. Usually an analysis of the variation in a parameter as a function of time is necessary. In fact, the association of data with time to create a temporal pattern for use in diagnosing component failures in automobile is unique to this invention. Fourth, the vibration measuring capability of the airbag crash sensor, or other accelerometer, is useful for most of the cases discussed above yet there is no such current use of this sensor. The airbag crash sensor is used only to detect crashes of the vehicle. Fifth, the second most used sensor in the above list, a microphone, does not currently appear on any automobiles yet sound is the signal most often used by vehicle operators and mechanics to diagnose vehicle problems. Another sensor that is listed above which also does not currently appear on automobiles is a pollution sensor. This is typically a chemical sensor mounted in the exhaust system for detecting emissions from the vehicle. It is expected that this and other chemical sensors will be used in the future.

In addition, from the foregoing depiction of different sensors which receive signals from a plurality of components, it is possible for a single sensor to receive and output signals from a plurality of components which are then analyzed by the processor to determine if any of the components for which the received signals were obtained by that sensor is operating in an abnormal state. Likewise, it is also possible to provide for a multiplicity of sensors each receiving a different signal related to a specific component which are then analyzed by the processor to determine if that component is operating in an abnormal state.

The discussion above has centered on notifying the vehicle operator of a pending problem with a vehicle component. Today, there is great competition in the automobile marketplace and the manufacturers and dealers who are more responsive to customers are likely to benefit by increased sales both from repeat purchasers and new customers. The diagnostic module disclosed herein benefits the dealer by making him instantly aware, through the cellular telephone system coupled to the diagnostic module or system in accordance with the invention, when a component is likely to fail. As envisioned, on some automobiles, when the diagnostic module 1700 detects a potential failure it not only notifies the driver through a display 2100, but also automatically notifies the dealer through a vehicle cellular phone 2200. The dealer can thus phone the vehicle owner and schedule an appointment to undertake the necessary repair at each party's mutual convenience. The customer is pleased since a potential vehicle breakdown has been avoided and the dealer is pleased since he is likely to perform the repair work. The vehicle manufacturer also benefits by early and accurate statistics on the failure rate of vehicle components. This early warning system can reduce the cost of a potential recall for components having design defects. The vehicle manufacturer will thus be guided toward producing higher quality vehicles thus improving his competitiveness. Finally, experience with this system will actually lead to a reduction in the number of sensors on the vehicle since only those sensors that are successful in predicting failures will be necessary.

For most cases it is sufficient to notify a driver that a component is about to fail through a warning display. In some critical cases, action beyond warning the driver may be required. If, for example, the diagnostic module detected that the alternator was beginning to fail, in addition to warning the driver of this eventuality, the module could send a signal to another vehicle system to turn of all non-essential devices which uses electricity thereby conserving electrical energy and maximizing the time and distance that the vehicle can travel before exhausting the energy in the battery. Similarly, in the event of a crash, the system can turn of all safety impacting devices such as the fuel pump to minimize the chance of a fire, for example.

In the discussion above, the diagnostic module of this invention assumes that a vehicle data bus exists which is used by all of the relevant sensors on the vehicle. Most vehicles today do not have a data bus although it is widely believed that most vehicles will have one in the future. Naturally, the relevant signals can be transmitted to the diagnostic module through a variety of coupling means other than through a data bus and this invention is not limited to vehicles having a data bus, nor must all devices by on a single or even multiple buses.

As can be appreciated from the above discussion, the invention described herein brings several new improvements to automobiles including, but not limited to, the use of pattern recognition technologies to diagnose potential vehicle component failures, the use of trainable systems thereby eliminating the need of complex and extensive programming, the simultaneous use of multiple sensors to monitor a particular component, the use of a single sensor to monitor the operation of many vehicle components, the monitoring of vehicle components which have no dedicated sensors, and the notification of both the driver and possibly an outside entity of a potential component failure in time so that the failure can be averted and vehicle breakdowns substantially eliminated.

To implement a component diagnostic system for diagnosing the component utilizing a plurality of sensors not directly associated with the component, i.e., independent of the component, a series of tests are conducted. For each test, the signals received from the sensors are input into a pattern recognition training algorithm with an indication of whether the component is operating normally or abnormally (the component being intentionally altered to provide for abnormal operation). The data from the test are used to generate the pattern recognition algorithm, e.g., neural network, so that in use, the data from the sensors is input into the algorithm and the algorithm provides an indication of abnormal or normal operation of the component. Also, to provide a more versatile diagnostic module for use in conjunction with diagnosing abnormal operation of multiple components, tests may be conducted in which each component is operated abnormally while the other components are operating normally, as well as tests in which two or more components are operating abnormally. In this manner, the diagnostic module may be able to determine based on one set of signals from the sensors during use that either a single component or multiple components are operating abnormally.

Furthermore, the pattern recognition algorithm may be trained based on patterns within the signals from the sensors. Thus, by means of a single sensor, it would be possible to determine whether one or more components are operating abnormally. To obtain such a pattern recognition algorithm, tests are conducted using a single sensor, such as a microphone, and causing abnormal operation of one or more components, each component operating abnormally while the other components operate normally and multiple components operating abnormally. In this manner, in use, the pattern recognition algorithm may analyze a signal from a single sensor and determine abnormal operation of one or more components.

The invention is also particularly useful in light of the foreseeable implementation of smart highways. Smart highways will result in vehicles travelling down highways under partial or complete control of an automatic system, i.e., not being controlled by the driver. The on-board diagnostic system will thus be able to determine failure of a component prior to or upon failure thereof and inform the vehicle's guidance system to cause the vehicle to move out of the stream of traffic, i.e., onto a shoulder of the highway, in a safe and orderly manner. Moreover, the diagnostic system may be controlled or programmed to prevent the movement of the disabled vehicle back into the stream of traffic until the repair of the component is satisfactorily completed.

In a method in accordance with this embodiment, the operation of the component would be monitored and if abnormal operation of the component is detected, e.g., by any of the methods and apparatus disclosed herein (although other component failure systems may of course be used in this implementation), the guidance system of the vehicle which controls the movement of the vehicle would be notified, e.g., via a signal from the diagnostic module to the guidance system, and the guidance system would be programmed to move the vehicle out of the stream of traffic, or off of the restricted roadway, possibly to a service station or dealer, upon reception of the particular signal from the diagnostic module. The automatic guidance systems for vehicles traveling on highways may be any existing system or system being developed, such as one based on satellite positioning techniques or ground-based positioning techniques. Since the guidance system may be programmed to ascertain the vehicle's position on the highway, it can determine the vehicle's current position, the nearest location out of the stream of traffic, or off of the restricted roadway, such as an appropriate shoulder or exit to which the vehicle may be moved, and the path of movement of the vehicle from the current position to the location out of the stream of traffic, or off of the restricted roadway. The vehicle may thus be moved along this path under the control of the automatic guidance system. In the alternative, the path may be displayed to a driver and the driver can follow the path, i.e., manually control the vehicle. The diagnostic module and/or guidance system may be designed to prevent re-entry of the vehicle into the stream of traffic, or off of the restricted roadway, until the abnormal operation of the component is satisfactorily addressed.

Several technologies have been described above all of which have the objective of improving the reliability and reducing the complexity of the wiring system in an automobile. The various switch technologies are aimed at improving the reliability of automobile switches. Most importantly, the bus technology described herein has as its objective simplification and increase in reliability of the vehicle wiring system. This wiring system was first conceived of as a method of permitting the location of airbag crash sensors at locations where they can most effectively sense a vehicle crash and yet permit that information to be transmitted to airbag control circuitry which may be located in a protective portion of the interior of the vehicle or may even be located on the airbag module itself. To protect this affirmation transmission requires a wiring system that is far more reliable and resistant to being destroyed in the vary crash that the sensor is sensing. This led to the realization that the data bus that carries the information from the crash sensor must be particularly reliable. Upon designing such a data bus, however, it was found that the capacity of that data bus far exceeded the needs of the crash sensor system. This then led to a realization that the capacity, or bandwidth, of such a bus would be sufficient to carry all of the vehicle information requirements. In some cases, this requires the use of high bandwidth bus technology such as twisted pair wires, shielded twisted pair wires, or coax cable. Naturally if a subset of all of the vehicle devices is included on the bus then the bandwidth requirements are less and simpler bus technologies can be used in place of the coax cable, for example. The economics that the accompany a data bus design which lies the highest reliability, highest bandwidth, is justified if all of the vehicle devices use the same system. This is where the greatest economies and greatest reliability occur. As described above, this permits, for example, the placement of the airbag firing electronics into the same housing that contains the airbag inflator. Once the integrity of the data bus is assured, such that it will not be destroyed during the crash itself, then the proper place for the airbag intelligence is in the airbag module itself. This further proves the reliability of the system since the shorting of the wires to the airbag module will not inadvertently set off the airbag as has happened frequently in the past.

When operating on the vehicle data bus, each device must have a unique address and each associated device must know that address. For most situations, therefore, this address must be predetermined and the assigned through an agreed-upon standard for all vehicles. Thus, the left rear tail light must have a unique address so that when the turn signal is turned to flash that light it does not also flash the right tail light, for example. Similarly, the side impact crash sensor which will operate on the same data bus as the frontal impact crash sensor, must issue a command to the side impact airbag and not to the frontal impact airbag.

One of the key advantages of a single bus system connecting all sensors in the vehicle together is the possibility of using this data bus to diagnose the health of the entire vehicle, as described in the detail above. Thus we can see the synergistic advantages of all the disparate technologies described above.

The design, construction, installation, and maintenance a vehicle data bus network requires attention to a many issues, including: an appropriate communication protocol, physical layer tranceivers for the selected media, capable microprocessors for both application and protocol execution, device controller hardware and software for the required sensors and actuators, etc. Such activities are known to those skilled in the art and will not be described in detail here.

An intelligent distributed system as described above can be based on the CAN Protocol, for example, which is a common protocol used in the automotive industry. CAN is a full function network protocol that provides both message checking and correction to insure communication integrity. Many of the devices on the system will have special diagnostics designed into them. For instance, some of the inflator controls can send warning messages if their backup power supply has insufficient charge. In order to assure the integrity and reliability of the bus system, most devices will be equipped with bi-directional communication as described above. Thus, when a message is sent to the rear right taillight to turn on, the light can return a message that it has executed the instruction.

Although several preferred embodiments are illustrated and described above, there are possible combinations using other signals and sensors for the components and different forms of the neural network implementation or different pattern recognition technologies that perform the same functions which can be utilized in accordance with the invention. Also, although the neural network has been described as an example of one means of pattern recognition, other pattern recognition means exist and still others are being developed which can be used to identify potential component failures by comparing the operation of a component over time with patterns characteristic of normal and abnormal component operation. In addition, with the pattern recognition system described above, the input data to the system may be data which has been pre-processed rather than the raw signal data either through a process called "feature extraction" or by various mathematical transformations. Also, any of the apparatus and methods disclosed herein may be used for diagnosing the state of operation or a plurality of discrete components.

Although several preferred embodiments are illustrated and described above, there are possible combinations using other geometries, materials and different dimensions for the components that perform the same functions. This invention is not limited to the above embodiments and should be determined by the following claims.

What is claimed is:

1. An electrical system in a vehicle, comprising
a plurality of devices used in the operation of the vehicle comprising at least one accelerometer, and
a single bus consisting of a pair of wires, said devices being connected to said bus and being supplied with power by said bus and communication through said bus,
each of said devices connected to said bus being assigned an address,
said bus being arranged to transfer data in the form of messages each having an address of at least one of said devices such that only said at least one of said devices assigned to said address is responsive to said message having said address,
each of said devices including means for determining whether said messages of said communication bus include said address assigned to said device.

2. The system of claim 1, wherein each of said devices is connected to both of said wires.

3. The system of claim 1, wherein said devices are selected from a group consisting of actuators, sensors, lights and switches.

4. The system of claim 1, wherein said means comprise a microprocessor.

5. The system of claim 1, further comprising a communications protocol selected from the Ethernet, token ring, token slot, CAN or spread spectrum protocols.

6. The system of claim 1, wherein each of said devices is arranged to acknowledge receipt of a communication via said bus and indicate operability of said device.

7. The system of claim 1, wherein at least one said devices includes a pair of electrical contacts each having a contact portion coated with abrasive particles and a conductive matrix.

8. The system of claim 1, wherein at least one of said devices is an airbag inflator initiation device.

9. The system of claim 8, wherein said airbag inflator initiation device includes circuitry having a diagnostic capability.

10. The system of claim 8, wherein said airbag inflator initiation device includes circuitry having a backup power supply capability.

11. The system of claim 1, wherein said pair of wires each run in a loop.

12. An electrical system in a vehicle, comprising
a plurality of devices used in the operation of the vehicle comprising at least one accelerometer, and
a single network coupled to said devices and constituting both a power distribution and a communication/information bus for said devices, said single network having no more than two wires,
each of said devices being assigned an address, said single network being arranged to transfer data in the form of messages each having an address of at least one of said devices such that only said at least one of said devices assigned to said address is responsive to said message having said address,
each of said devices including means for determining whether each of said messages includes said address assigned to said device.

13. The system of claim 12, wherein said devices are selected from a group consisting of actuators, sensors, lights and switches.

14. The system of claim 12, wherein at least one of said devices is an airbag inflator initiation device.

15. The system of claim 14, wherein said airbag inflator initiation device includes circuitry having a diagnostic capability.

16. The system of claim 14, wherein said airbag inflator initiation device includes circuitry having a backup power supply capability.

17. The system of claim 12, wherein said means comprise a microprocessor.

18. The system of claim 12, wherein said network is a time multiplex network.

19. The system of claim 12, wherein said network consists of a single wire connecting all of said devices, each of said devices being ground to an adjacent part of the vehicle.

20. The system of claim 12, wherein any of the wires of said network each run in a loop.

21. An electrical system in a vehicle, comprising
a plurality of sensors, each detecting a physical characteristic of the vehicle,
a bus, some of said sensors being connected to said bus, and
a module connected to said bus and arranged to receive signals from said sensors and process said signals to provide information derived from the physical characteristics detected by said sensors, said module being arranged to process the information derived from the physical characteristics detected by said sensors to determine whether a component in the vehicle other than said sensors is operating normally or abnormally.

22. The system of claim 21, further comprising
a display coupled to said module for displaying the information derived from the physical characteristics detected by said sensors.

23. The system of claim 21, further comprising
a telecommunications device coupled to said module for communicating with a remote station to provide the remote station with the information derived from the physical characteristics detected by said sensors.

24. The system of claim 21, wherein said sensors generate signals containing information as to whether the component is operating normally or abnormally, said module comprising pattern recognition means for receiving said signals and ascertaining whether said signals contain patterns representative of normal or abnormal operation of the component.

25. The system of claim 21, wherein said bus consists of a pair of wires which provide both power and communication for said sensors.

26. The system of claim 21, wherein said bus comprises a pair of wires each running in a loop.

27. An electrical system in a vehicle, comprising
a plurality of devices used in the operation of the vehicle, at least one of said devices being an airbag initiator, and
a single bus consisting of a pair of wires, said devices being connected to said bus and being supplied with power by said bus and communicating through said bus,
each of said devices connected to said bus being assigned an address,
said bus being arranged to transfer data in the form of messages each having an address of at least one of said devices such that only said at least one of said devices assigned to said address is responsive to said message having said address,
each of said devices including means for determining whether said messages of said communication bus include said address assigned to said device.

28. The system of claim 27, wherein said pair of wires each run in a loop.

29. An electrical system in a vehicle, comprising
a plurality of devices used in the operation of the vehicle comprising at least one of an accelerometer and an airbag initiator, and
a single bus comprising at least two wires each running in a loop, said devices being connected to said bus and receiving at least one of power and communications through said bus.

30. The system of claim 29, wherein said devices and said bus are arranged such that said devices receive both power and communications through said bus.

31. The system of claim 29, wherein said bus consists of two wires.

* * * * *